(12) United States Patent
Warth et al.

(10) Patent No.: US 10,378,616 B2
(45) Date of Patent: Aug. 13, 2019

(54) TRANSMISSION FOR A VEHICLE

(71) Applicant: ZF Friedrichshafen AG, Friedrichshafen (DE)

(72) Inventors: Viktor Warth, Friedrichshafen (DE); Michael Wechs, Weißensberg (DE); Stefan Beck, Eriskirch (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 15/785,951

(22) Filed: Oct. 17, 2017

(65) Prior Publication Data
US 2018/0112747 A1 Apr. 26, 2018

(30) Foreign Application Priority Data
Oct. 26, 2016 (DE) .................. 10 2016 221 122

(51) Int. Cl.
*F16H 3/66* (2006.01)
*B60K 6/365* (2007.10)
*B60K 6/387* (2007.10)
*B60K 6/48* (2007.10)
*B60K 6/547* (2007.10)
*B60K 6/38* (2007.10)

(52) U.S. Cl.
CPC ............ *F16H 3/663* (2013.01); *B60K 6/365* (2013.01); *B60K 6/387* (2013.01); *B60K 6/48* (2013.01);
(Continued)

(58) Field of Classification Search
CPC ............ F16H 3/663; F16H 2200/2025; F16H 2200/0052; F16H 3/666; F16H 2200/201; F16H 2200/2048
(Continued)

(56) References Cited

U.S. PATENT DOCUMENTS 4,914,978 A * 4/1990 Moroto .................. F16H 3/663
475/205
6,558,287 B2 * 5/2003 Hayabuchi ............... F16H 3/66
475/271
(Continued)

FOREIGN PATENT DOCUMENTS

| DE | 3131138 A1 | 2/1983 |
| DE | 69018675 T2 | 8/1995 |
| DE | 10334810 A1 | 3/2004 |
| DE | 102015212487 A1 | 1/2017 |
| DE | 102015218587 A1 | 3/2017 |
| JP | 2007321770 A | 12/2007 |

OTHER PUBLICATIONS

German Search Report DE102016221122.6 dated Sep. 6, 2017. (12 pages).

*Primary Examiner* — Roger L Pang
(74) *Attorney, Agent, or Firm* — Dority & Manning, P.A.

(57) ABSTRACT

A transmission (G) for a motor vehicle includes an in-order-of-rotation-speed fourth shaft (W4) permanently connected to a transmission output (GW2-A), an in-order-of-rotation-speed first shaft (W1) either fixable by engaging a first shift element (B1) or connectable in a rotationally fixed manner with a transmission input (GW1-A) by actuating a second shift element (K1), an in-order-of-rotation-speed second shaft (W2) connectable in a rotationally fixed manner with the transmission input (GW1-A) by actuating a third shift element (K2), an in-order-of-rotation-speed third shaft (W3) is connectable in a rotationally fixed manner with the transmission input (GW1-A) by actuating a fourth shift element (K3), and an in-order-of-rotation-speed fifth shaft (W5) fixable by engaging a fifth shift element (B2).

18 Claims, 24 Drawing Sheets

(52) U.S. Cl.
CPC ........ *B60K 6/547* (2013.01); *B60K 2006/381* (2013.01); *B60K 2006/4825* (2013.01); *F16H 3/666* (2013.01); *F16H 2200/0052* (2013.01); *F16H 2200/0065* (2013.01); *F16H 2200/0091* (2013.01); *F16H 2200/201* (2013.01); *F16H 2200/2005* (2013.01); *F16H 2200/2007* (2013.01); *F16H 2200/2025* (2013.01); *F16H 2200/2046* (2013.01); *F16H 2200/2048* (2013.01); *F16H 2200/2064* (2013.01); *F16H 2200/2094* (2013.01); *Y02T 10/6221* (2013.01); *Y02T 10/6252* (2013.01)

(58) Field of Classification Search
USPC .................................................. 475/275–291
See application file for complete search history.

(56) References Cited

U.S. PATENT DOCUMENTS

| | | |
|---|---|---|
| 6,875,149 B2 | 4/2005 | Kohno et al. |
| 7,833,124 B2* | 11/2010 | Choi ........................ F16H 3/663 475/286 |
| 8,360,922 B2* | 1/2013 | Kraynev ................ F16H 3/663 475/277 |
| 2004/0180751 A1* | 9/2004 | Heitmann ............... F16H 3/663 475/284 |
| 2005/0064981 A1* | 3/2005 | Haka ........................ F16H 63/28 475/269 |
| 2006/0025276 A1* | 2/2006 | Shim ........................ F16H 3/663 475/284 |
| 2006/0172850 A1* | 8/2006 | Sung ........................ F16H 3/663 475/269 |

\* cited by examiner

| Gear | B1 | K1 | K2 | K3 | B2 | B3 |
|------|----|----|----|----|----|----|
| 1    |    | x  |    |    | x  |    |
| 2    |    |    | x  |    | x  |    |
| 3    |    |    |    | x  | x  |    |
| 4.1  |    | x  | x  |    |    |    |
| 4.2  |    | x  |    | x  |    |    |
| 4.3  |    |    | x  | x  |    |    |
| 5    | x  |    | x  |    |    |    |
| 6    | x  | x  |    |    |    |    |
| R1   |    |    |    |    |    | x  |
| R2   |    |    | x  |    |    | x  |

Fig. 9

| Gear | B1 | K1 | K2 | K3 | B2 |
|------|----|----|----|----|----|
| 1    |    | x  |    |    | x  |
| 2    |    |    | x  |    | x  |
| 3    |    |    |    | x  | x  |
| 4.1  |    | x  |    | x  |    |
| 4.2  |    | x  | x  |    |    |
| 4.3  |    |    | x  | x  |    |
| 5    | x  |    |    | x  |    |
| 6    | x  |    | x  |    |    |

Fig. 12

| Gear | B1 | K1 | K2 | K3 | B2 | B3 | B4/K4 |
|------|----|----|----|----|----|----|-------|
| 1'   |    |    |    |    | x  |    | x     |
| 2'   |    | x  |    |    | x  |    |       |
| 3'   |    |    | x  |    | x  |    |       |
| 4'   |    |    |    | x  | x  |    |       |
| 5.1' |    | x  |    | x  |    |    |       |
| 5.2' |    |    | x  | x  |    |    |       |
| 5.3' |    |    |    |    |    |    | x     |
| 6'   |    |    | x  | x  |    |    |       |
| 7'   | x  |    |    | x  |    |    |       |
| 8'   | x  |    | x  |    |    |    |       |
| 9'   |    |    |    |    |    |    | x     |
| R1'  |    | x  | x  |    |    | x  |       |
| R2'  |    |    |    |    |    | x  | x     |
| R3'  |    |    | x  |    |    | x  |       |

Fig. 24

TRANSMISSION FOR A VEHICLE

FIELD OF THE INVENTION

The invention relates generally to a transmission for a motor vehicle and a motor vehicle drive train having such a transmission.

BACKGROUND

DE 31 31 138 A1 shows a transmission, in which a plurality of planetary gear sets is provided between a transmission input and a transmission output. According to a variant of DE 31 31 138 A1 depicted in FIG. 1, two planetary gear sets are combined to form one main gear set, wherein the one planetary gear set is configured as a negative or minus planetary gear set and the other planetary gear set is configured as a positive or plus planetary gear set, and planetary gears of the minus planetary gear set and radially inner planetary gears of the plus planetary gear set are formed by stepped planetary gears. Eight shift elements are further provided, via the paired selective actuation of which the main gear set and two further planetary gear sets can be coupled to one another to define a variety of gears between the transmission input and the transmission output. In total, six forward gears and one reverse gear can be shifted between the transmission input and the transmission output.

SUMMARY OF THE INVENTION

In the present context, a transmission refers to a multi-speed transmission; i.e., a plurality of different gear ratios can be shifted as gears between a transmission input and a transmission output of the transmission by actuating corresponding shift elements, whereby this is preferably performed automatically. Depending on the arrangement of the shift elements, said shift elements are either clutches or brakes. Such transmissions are predominantly used in motor vehicles to convert a tractive force supply of a drive motor of the respective motor vehicle, in a manner suitable with respect to a variety of criteria.

Example aspects of the present invention provide an alternative configuration to the transmission known in the state of the art, whereby said transmission can be characterized by a design that is as compact as possible.

According to example aspects of the invention, a transmission includes a transmission input, a transmission output, a main gear set, which is composed of two planetary gear sets, and a first, a second, a third, a fourth and a fifth shift element. The main gear set further includes exactly five shafts, designated in order of rotation speed as the first shaft, the second shaft, the third shaft, the fourth shaft and the fifth shaft. These five shafts are characterized in that the speeds of said shafts increase or decrease in a linear manner in the stated order, or are equal. In other words, the speed of the first shaft is lower than or equal to the speed of the second shaft. The speed of the second shaft is in turn lower than or equal to the speed of the third shaft. The speed of the third shaft is lower than or equal to the speed of the fourth shaft. The speed of the fourth shaft is lower than or equal to the speed of the fifth shaft. This order is also reversible, however, so that the fifth shaft exhibits the lowest speed, while the fourth shaft has a speed that is greater than or equal to the speed of the fifth shaft, and so on. There is thus always a linear correlation between the speeds of the five shafts. In doing so, the speed of one or more of the five shafts can also assume negative values or the value zero. The order of rotation speed must therefore always be related to the signed value of the speeds and not to the absolute value thereof.

The in-order-of-rotation-speed fourth shaft is thereby permanently connected to the transmission output, while the in-order-of-rotation-speed first shaft can either be fixed by engaging the first shift element or connected in a rotationally fixed manner to the transmission input by actuating the second shift element. The in-order-of-rotation-speed second shaft can likewise be brought into a torque-proof connection with the transmission input by actuating the third shift element, while the in-order-of-rotation-speed third shaft can be connected in a rotationally fixed manner to the transmission input by actuating the fourth shift element. Finally, the in-order-of-rotation-speed fifth shaft can be fixed by engaging the fifth shift element.

In other words, the in-order-of-rotation-speed fourth shaft is permanently connected in a rotationally fixed manner to the transmission output, while the in-order-of-rotation-speed first shaft, the in-order-of-rotation-speed second shaft and also the in-order-of-rotation-speed third shaft can respectively be connected in a rotationally fixed manner to the transmission input. To do this, the second shift element must be engaged for the in-order-of-rotation-speed first shaft, the third shift element must be engaged for the in-order-of-rotation-speed second shaft and the fourth shift element must be engaged for the in-order-of-rotation-speed third shaft. Aside from that, the in-order-of-rotation-speed first shaft can also be fixed by actuating the first shift element, i.e. braked to a standstill, and kept at a standstill. The in-order-of-rotation-speed fifth shaft can likewise be fixed by engaging the fifth shift element.

The second, the third and the fourth shift element are consequently designed as clutches, which, when actuated, align the respective shaft and the transmission input of the transmission to one another in terms of their speed, while the first and the fifth shift element are present in the form of brakes, which, when actuated, brake the respective shaft of the transmission to standstill and fix the respective shaft to a torque-proof component. The latter is in particular a transmission housing or a section of such a transmission housing.

In the sense of the invention, a "shaft" is understood to mean a rotatable component of the transmission, by which components, in particular gears, of the transmission are respectively connected to one another axially and/or radially in a rotationally fixed manner, or by which such a connection can be established by actuating a corresponding shift element. The respective shaft can therefore also be present in the form of a radial intermediate piece, via which a respective component is connected, for example radially, to the transmission output.

In the sense of the invention, the transmission input is preferably formed at a drive shaft, via which a drive movement is introduced into the transmission. Within the scope of the invention, the transmission output can be present at the end of an output shaft, via which the drive movement, which has been converted in accordance with the respective shifted gear, is brought out of the transmission. In doing so, the in-order-of-rotation-speed fourth shaft can form this output shaft, or it can be connected in a rotationally fixed manner to a separate output shaft.

A transmission according to example aspects of the invention is characterized by a compact design. As will be described in more detail in the following, this allows six forward gears to be formed via the two planetary gear sets of the main gear set alone.

To achieve this, the five shift elements must be engaged selectivity in pairs. A first forward gear is shifted by engaging the second and the fifth shift element, while the third and the fifth shift element must be engaged to represent a second forward gear. A third forward gear is formed by engaging the fourth and the fifth shift element, while a fourth forward gear results from the actuation of the second and the fourth shift element. Alternatively, a fourth forward gear can also be shifted by engaging the second and the third shift element or also by actuating the third and the fourth shift element. To shift a fifth forward gear, on the other hand, the first and the fourth shift element must be engaged, while a sixth forward gear can be shifted by actuating the first and the third shift element.

With a suitable selection of stationary carrier transmission ratios for the planetary gear sets, a range of transmission ratios appropriate for use in the area of a motor vehicle is thus realized. For a successive shifting of the forward gears according to their sequence, in each case, with the exception of the second option of representing the fourth forward gear, the status of two of the shift elements must be changed. To represent the subsequent forward gear, one of the shift elements involved in the preceding forward gear must be disengaged and another shift element must be engaged. A result of this is that shifting between gears can be very quick.

According to one embodiment of the invention, a sixth shift element is additionally provided, whereby the in-order-of-rotation-speed third shaft can be fixed by engaging the sixth shift element. As a result, at least one reverse gear can be represented between the transmission input and the transmission output via the main gear set by engaging the sixth shift element and either the second shift element or the third shift element. Specifically, a first reverse gear can be shifted by actuating the second and the sixth shift element, while a second reverse gear results when the third and the sixth shift element are engaged.

With the transmission according to example aspects of the invention, at least one reverse gear can thus advantageously be realized for a drive by way of the drive motor positioned upstream of the transmission. This can be realized as an alternative or in addition to an arrangement of an electric motor in the transmission, in order to be able to allow the motor vehicle to travel in reverse if the electric motor fails.

In a further development of the invention, the fifth shift element and the sixth shift element are combined to form one dual shift element. The advantage of this is that the functions of the fifth and the sixth shift element can be realized in a compact manner, especially since the two shift elements do not have to be actuated at the same time to implement the individual gears.

According to a further example configuration of the invention, the first planetary gear set of the main gear set includes at least one planetary gear, which is in mesh with both a sun gear of the first planetary gear set and a ring gear of the first planetary gear set, and is coupled in a rotationally fixed manner to one respective radially inner planetary gear of the second planetary gear set of the main gear set. In addition, the respective radially inner planetary gear meshes with a sun gear of the second planetary gear set and one respective radially outer planetary gear of the second planetary gear set, which is also in mesh with a ring gear of the second planetary gear set. In this case therefore, the first planetary gear set is designed as a negative or minus planetary gear set, while the second planetary gear set is present in the form of a positive or plus planetary gear set. This makes the particularly compact design of the transmission possible. The transmission according to example aspects of the invention also exhibits low component loads and a good gear efficiency.

The transmission input is preferably provided axially on a side of the first planetary gear set facing away from the second planetary gear set, whereby the first and the second shift element are located on the same side of the first planetary gear set, as a result of which they are easily accessible. In some circumstances, a common supply of these shift elements could be performed. The third and the fourth shift element are provided axially, in particular on a side of the second planetary gear set facing away from the first planetary gear set, while the fifth shift element is disposed axially, substantially at the level of and radially surrounding the first planetary gear set. The optionally additionally provided sixth shift element is furthermore preferably positioned axially at the level of and radially surrounding the second planetary gear set.

Alternatively, however, it is also conceivable, for the transmission input to be configured on a side of the second planetary gear set facing away from the first planetary gear set. The third and the fourth shift element would then be positioned on the side of the transmission input, while the first and the second shift element are disposed facing away from said transmission input.

In a further development of the aforementioned example configuration, the at least one planetary gear of the first planetary gear set and the respective radially inner planetary gear of the second planetary gear set are combined to form one respective stepped planetary gear. In this case, therefore, at least one stepped planetary gear with preferably two gearings on differently-sized effective diameters is used in the transmission, whereby a larger effective diameter in particular represents the at least one planetary gear of the first planetary gear set, while a smaller effective diameter represents the one respective radially inner planetary gear of the second planetary gear set.

Further preferably, the planetary gear sets are integrated in such a way that the in-order-of-rotation-speed first shaft is connected in a rotationally fixed manner to the sun gear of the first planetary gear set, while the in-order-of-rotation-speed second shaft is connected in a rotationally fixed manner to the sun gear of the second planetary gear set. The in-order-of-rotation-speed third shaft is furthermore connected in a rotationally fixed manner to the ring gear of the second planetary gear set, while the in-order-of-rotation-speed fourth shaft is connected in a rotationally fixed manner to a planetary carrier, which carries the at least planetary gear of the first planetary gear set and the planetary gears of the second planetary gear set mounted jointly in a rotatable manner. Lastly, the in-order-of-rotation-speed fifth shaft is connected in a rotationally fixed manner to the ring gear of the first planetary gear set.

In a further development of the invention, one or more shift elements are respectively realized as force-locking shift elements. The advantage of force-locking shift elements is that they can also be shifted under load, so that a change between gears can be performed without interruption of the tractive force. Particularly preferably, however, the second shift element and/or the fifth shift element and/or the sixth shift element are each respectively designed as a positive-locking shift element, for example as a dog clutch or a locking synchronization. This is because, at least in the realization of the fourth forward gear according to the third variant, the second shift element is involved in only the first forward gear and possibly also in one reverse gear, so that, in the event of a successive upshifting of the gears, the second shift element has to be disengaged only once. The fifth shift element is involved in shifting the first three forward gears, so that it likewise is disengaged only once in the course of a successive upshifting. The sixth shift element is involved only in the representation of the reverse gears. Compared to a force-locking shift element, a positive-locking shift element has the advantage that only low drag torques occur in the disengaged state, as a result of which higher efficiency can be achieved.

In a further development of the invention, an electric motor is provided, the rotor of which is coupled in a rotationally fixed manner to one of the rotatable components of the transmission. A stator of the electric motor is then preferably connected in a rotationally fixed manner to the torque-proof component of the transmission, whereby the electric motor can be operated as an electric motor and/or a generator to realize different functions. In particular, purely electric driving, boosting via the electric motor, braking and recuperation and/or synchronization in the transmission can be performed via the electric motor. The rotor of the electric motor can be positioned coaxially with or disposed axially offset to the respective component, whereby, in the latter case, a coupling can then be realized by way of one or more intermediate transmission stages, for example in the form of one of more spur gear stages or planetary stages, or even a traction mechanism drive.

It is preferable, however, for the rotor of the electric motor to be permanently coupled to the transmission input, as a result of which a purely electric driving of the motor vehicle is represented in a suitable manner. In doing so, one or more of the shift elements could be used as internal launching elements for electric driving. For purely electric driving, one of the gears in the transmission is shifted, whereby reverse travel of the motor vehicle can be realized in the forward gears as well by initiating an opposite rotation via the electric motor. The reverse travel of the motor vehicle therefore takes place in the gear ratio of the respective forward gear. As a result, the gear ratios of the forward gears can be used for both electric forward travel and electric reverse travel. The rotor of the electric motor could, however, also be connected to one of the remaining rotatable components of the transmission.

According to a further example configuration of the invention, which is realized in particular in combination with the aforementioned arrangement of an electric motor, a disconnect clutch is also provided, by which the transmission input can be connected to a connecting shaft in a rotationally fixed manner. The connecting shaft is then used within a motor vehicle drive train for the connection to the drive motor. The provision of the disconnect clutch has the advantage that a connection to the drive motor can be interrupted during purely electric driving, as a result of which said drive motor is not dragged along. The disconnect clutch is preferably designed as a force-locking shift element, for example as a multi-disc clutch, but can just as well be present as a positive-locking shift element, such as a dog clutch or a locking synchronization.

In principle, the transmission can always be preceded by a launching element, for example a hydrodynamic torque converter or a friction clutch. This launching element can then also be a component of the transmission and serves to configure a launching process, by enabling a slip speed between the internal combustion engine and the transmission input of the transmission. One of the shift elements of the transmission or the possibly existing disconnect clutch can also be configured as such a launching element, by being present as a frictional shift element. In addition, it is always possible to dispose a freewheel to the transmission housing or to another shaft on each shaft of the transmission.

According to another embodiment of the invention, an upstream gear set including a planetary gear set having a ring gear, a planetary carrier and a sun gear is additionally provided. Providing an upstream gear set has the advantage that the number of representable gears can be increased.

According to a first further development of the aforementioned embodiment, the first component of the upstream gear set is connected in a rotationally fixed manner to the transmission input and the second component is connected in a rotationally fixed manner to the in-order-of-rotation-speed third shaft of the main gear set, while the third component can be fixed by an additional shift element. Alternatively, the first component of the upstream gear set is connected in a rotationally fixed manner to the transmission input and the second component is fixed, while the third component can be connected in a rotationally fixed manner to the in-order-of-rotation-speed third shaft of the main gear set by an additional shift element. As a further alternative, the first component of the upstream gear set is connected in a rotationally fixed manner to the in-order-of-rotation-speed third shaft of the main gear set and the second component is fixed, while the third component can be connected in a rotationally fixed manner to the transmission input by an additional shift element.

A suitable transmission can be realized for each of the three example variants, whereby the upstream gear set can be configured as a negative or minus planetary gear set, in which at least one planetary gear that is rotatably mounted via the planetary carrier is in mesh with both the sun gear and the ring gear of the upstream gear set. The upstream gear set could also be realized as a positive or plus planetary gear set, in which the planetary carrier carries at least one planetary gear pair, in which the one planetary gear is in mesh with the inner sun gear and the other planetary gear is in mesh with the circumferential ring gear, and the planetary gears are in mesh with one another. As a further alternative, the upstream gear set could also be designed as a stepped planetary gear set.

In the case of a transmission according to example aspects of the invention with an upstream gear set, a total of nine forward gears can be realized by combining with the main gear set. A first forward gear is shifted by engaging the fifth and the additional shift element, while the second and the fifth shift element must be engaged to represent a second forward gear. A third forward gear is formed by engaging the third and the fifth shift element, while a fourth forward gear results from the actuation of the fourth and the fifth shift element. For shifting a fifth forward gear, on the other hand, the second and the fourth shift element must be engaged, whereby a fifth forward gear can alternatively also be shifted by engaging the second and the third shift element or also by actuating the third and the fourth shift element. A sixth forward gear can additionally be shifted by actuating the fourth and the additional shift element, while a seventh forward gear can be represented by engaging the first and the fourth shift element. Lastly, an eighth forward gear is obtained by actuating the third and the additional shift element, and a ninth forward gear is obtained by engaging the first and the third shift element.

Depending on the specific arrangement, the additional shift element is designed as a clutch or as a brake. Furthermore, by combining the embodiment with an upstream gear set with the variant in which a sixth shift element is provided, multiple reverse gears can be formed. A first reverse gear can thus be shifted by engaging the sixth and the additional shift element, while the second and the sixth shift element have to be engaged for a second reverse gear. A third reverse gear can additionally be formed by actuating the third and the sixth shift element.

The transmission according to example aspects of the invention is in particular part of a motor vehicle drive train and is then disposed between a drive motor of the motor vehicle, which is designed in particular as an internal combustion engine, and other subsequent components of the drive train in power flow direction to the drive wheels of the motor vehicle. In doing so, the transmission input of the transmission is either permanently coupled in a rotationally fixed manner to a crankshaft of the internal combustion engine, or can be connected to said crankshaft via an intermediate disconnect clutch or a launching element, whereby a torsional vibration damper can additionally be provided between the internal combustion engine and the transmission. On the output side, the transmission is then preferably coupled to an axle transmission of a drive axle of the motor vehicle within the motor vehicle drive train, whereby here, however, there can also be a connection to a longitudinal differential, via which a distribution to a plurality of driven axles of the motor vehicle takes place. The axle transmission or the longitudinal differential can be disposed with the transmission in a common housing. A torsional vibration damper can be integrated into this housing as well.

In the sense of the invention, two components of the transmission being "connected" or "coupled" or "connected to one another" means a permanent connection of these components, so that they cannot rotate independently of one another. In this sense, no shift element is provided between these components, which can be elements of the planetary gear sets or also shafts or a torque-proof component of the transmission; instead the corresponding components are rigidly coupled to one another. The permanently interconnected components could optionally also be configured in one piece.

If, on the other hand, a shift element is provided between two components of the transmission, these components are not permanently coupled in a rotationally fixed manner to one another; instead a rotationally fixed coupling is performed by actuating the intermediate shift element. In the sense of the invention, actuation of the shift element means that the shift element in question is transferred into an engaged state and, as a result, the rotational movements of the components which are directly linked to the shift element are aligned. In the case of a configuration of the shift element in question as a positive-locking shift element, the components hereby directly connected to one another in a rotationally fixed manner will rotate at the same speed, while, in the case of a force-locking shift element, speed differences between the components can exist even after actuation of said shift element. Within the scope of the invention, this intended, or also unintended, state is nonetheless referred to as a rotationally fixed connection of the respective components via the shift element.

The invention is not restricted to the stated combination of the features of the main claim or the claims dependent thereon. There are additional possibilities for combining individual features, even insofar as they emerge from the claims, the following description of preferred embodiments of the invention or directly from the drawings. Referencing the claims to the drawings by using reference signs should not limit the scope of protection of the claims.

BRIEF DESCRIPTION OF THE DRAWINGS

Advantageous embodiments of the invention, which are discussed in the following, are shown in the drawings. The drawings show:

FIG. 9 an example of an engagement sequence diagram of the example transmissions of FIGS. 2 to 7;

FIG. 12 an example of an engagement sequence diagram of the example transmissions of FIGS. 10 and 11;

FIG. 24 an example of an engagement sequence diagram of the example transmissions of FIGS. 13 to 23.

DETAILED DESCRIPTION

Figure 1:
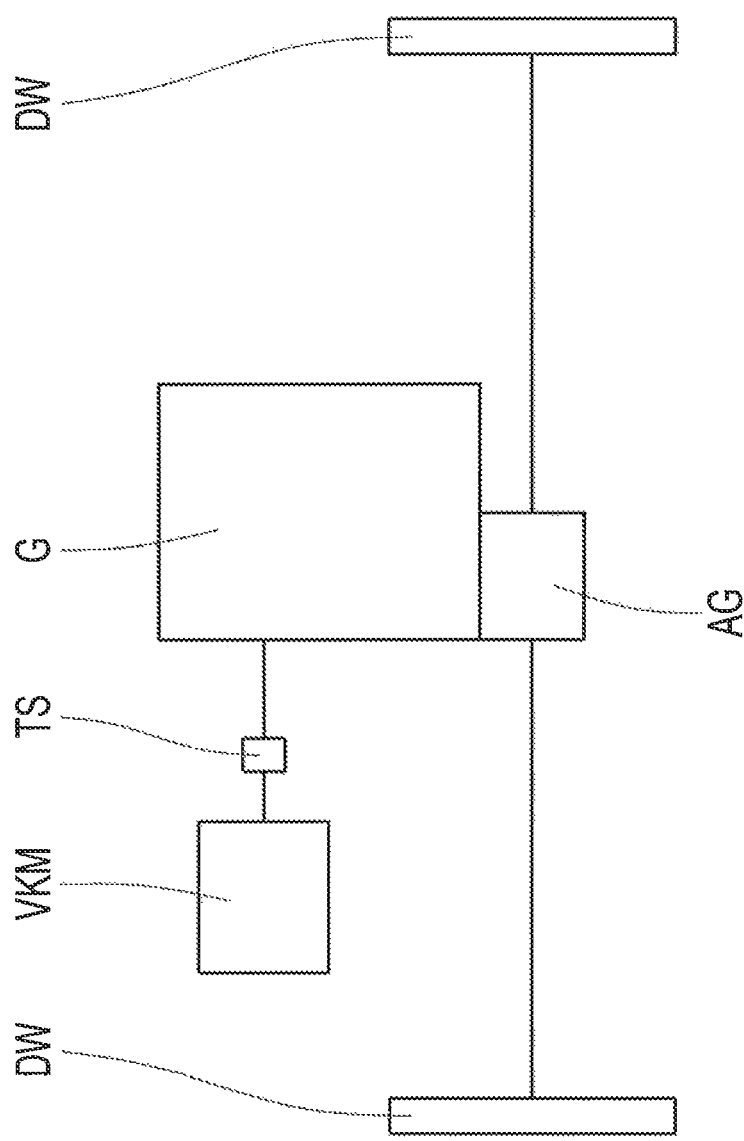
FIG. 1 a schematic view of a motor vehicle drive train, in which a transmission according to example aspects of the invention is used.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a schematic view of a motor vehicle drive train, in which an internal combustion engine VKM is connected to a transmission G via an intermediate torsional vibration damper TS. An axle transmission AG is connected downstream of the transmission G on the output side, via which a drive power is distributed to drive wheels DW of a drive axle of the motor vehicle. The transmission G and the axle transmission AG are combined in a common transmission housing. The torsional vibration damper TS can be integrated into this transmission housing as well.

Figure 2:
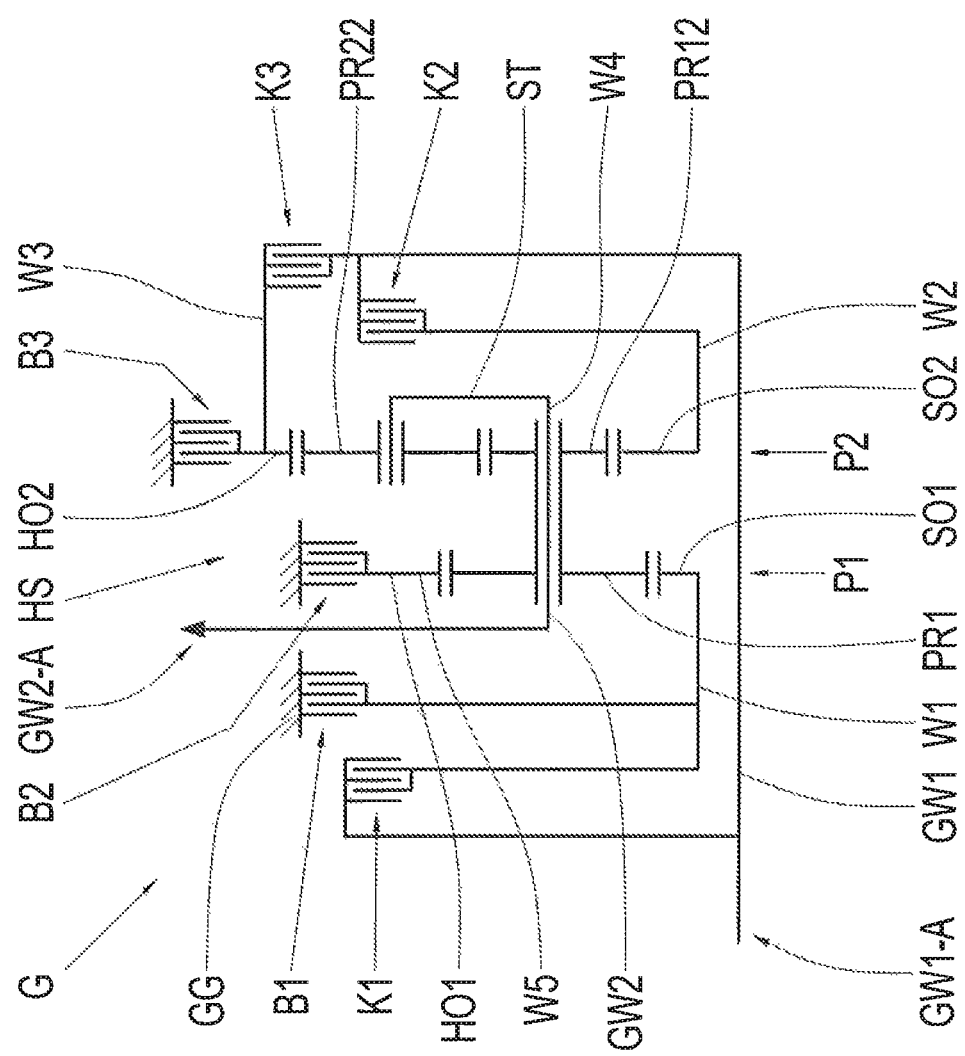
FIG. 2 a schematic view of a transmission according to a first example embodiment of the invention.

FIG. 2 shows a schematic representation of a transmission G according to a first example embodiment of the invention. The transmission G includes a main gear set HS, which is composed of two planetary gear sets P1 and P2, wherein the first planetary gear set P1 is designed as a negative or minus planetary gear set, in which at least one planetary gear PR1 is in simultaneous mesh with both a radially inner sun gear SO1 and a radially circumferential ring gear HO1. In contrast, the second planetary gear set P2 of the main gear set HS is designed as a positive or plus planetary gear set, in which at least one planetary gear pair is provided with one respective radially inner planetary gear PR12 and one respective radially outer planetary gear PR22. The respective radially inner planetary gear PR12 meshes with a sun gear SO2 of the second planetary gear set P2 and the radially outer planetary gear PR22 meshes with a ring gear HO2 of the second planetary gear set P2, whereby the planetary gears PR12 and PR22 of the respective planetary gear pair also mesh with one another.

As can be seen in FIG. 2, the at least one planetary gear PR1 of the first planetary gear set P1 and the respective radially inner planetary gear PR12 of the at least one planetary gear pair of the second planetary gear set P2 are connected in a rotationally fixed manner to one another. Specifically, the planetary gear PR1 and the planetary gear PR12 are combined to form one respective stepped planetary gear, which is provided with two axially adjacent gearings. In doing so, the planetary gear PR1 is represented by the gearing of the stepped planetary gear with the larger effective diameter and the planetary gear PR12 is represented by the gearing of the stepped planetary gear with the smaller effective diameter. In addition, the one respective stepped planetary gear and the respective remaining planetary gear PR22 are rotatably mounted together in a planetary carrier ST.

The main gear set HS includes five shafts, which are designated in order of rotation speed as the first shaft W1, the second shaft W2, the third shaft W3, the fourth shaft W4 and the fifth shaft W5. The in-order-of-rotation-speed fourth shaft W4 is permanently connected to the planetary carrier ST and to a transmission output GW2-A and forms an output shaft GW2 of the transmission G. In addition, the in-order-of-rotation-speed first shaft W1 is connected to the sun gear SO1 of the first planetary gear set P1 in a rotationally fixed manner and can be fixed to a torque-proof component GG via a first shift element B1, which is preferably a transmission housing of the transmission G. Alternatively, the in-order-of-rotation-speed first shaft W1 can be coupled in a rotationally fixed manner to a transmission input GW1-A by a second shift element K1, which is configured on one end of a drive shaft GW1 of the transmission G. The in-order-of-rotation-speed second shaft W2 can also be connected in a rotationally fixed manner to the transmission input GW1-A by a third shift element K2, whereby the in-order-of-rotation-speed second shaft W2 is connected in a rotationally fixed manner to the sun gear SO2 of the second planetary gear set P2.

The in-order-of-rotation-speed third shaft W3 is furthermore connected in a rotationally fixed manner to the ring gear HO2 of the second planetary gear set P2, and can be coupled in a rotationally fixed manner to the drive shaft GW1, and thus also to the transmission input GW1-A, via a fourth shift element K3. The in-order-of-rotation-speed fifth shaft W5 can be fixed to the torque-proof component GG via a fifth shift element B2 and is also permanently coupled in a rotationally fixed manner to the ring gear HO1 of the first planetary gear set P1. Lastly, the in-order-of-rotation-speed third shaft W3 can also be fixed to the torque-proof component GG by a sixth shift element B3.

The shift elements B1, K1, K2, K3, B2 and B3 are respectively designed as force-locking shift elements and are preferably present in the form of multi-disc shift elements. In addition, in the present case, the first shift element B1, the fifth shift element B2 and the sixth shift element B3 are designed as brakes, while the second shift element K1, the third shift element K2 and the fourth shift element K3 are in the form of clutches.

The planetary gear sets P1 and P2 are arranged axially in the sequence first planetary gear set P1 and second planetary gear set P2, whereby the first shift element B1 and the second shift element K1 are positioned axially on a side of the first planetary gear set P1 facing away from the second planetary gear set P2, on which the transmission input GW1-A is located as well. On the other hand, the third shift element K2 and the fourth shift element K3 are provided on a side of the second planetary gear set P2 facing away from the transmission input GW1-A and the first planetary gear set P1, while the fifth shift element B2 is positioned axially, substantially at the level of and radially surrounding the first planetary gear set P1. In contrast, the sixth shift element B3 is axially at the level of and radially surrounding the second planetary gear set P2.

The transmission input GW1-A and the transmission output GW2-A are positioned coaxially with respect to one another, whereby, in the motor vehicle drive train from FIG. 1, the transmission input GW1-A serves to form a connection to the internal combustion engine VKM, while the transmission G is connected to the downstream axle transmission AG at the transmission output GW2-A. The transmission output GW2-A is preferably formed by a gearing (not shown here), which, in the installed state of the transmission G, meshes with an associated gearing of a not depicted shaft. This shaft is then arranged axially parallel to the transmission input GW1-A and the transmission output GW2-A, whereby the axle transmission AG can then be disposed on this shaft. In this respect, the transmission G shown in FIG. 2 is suitable for use in a motor vehicle drive train that is oriented transversely to the direction of travel of the motor vehicle.

Figure 3:
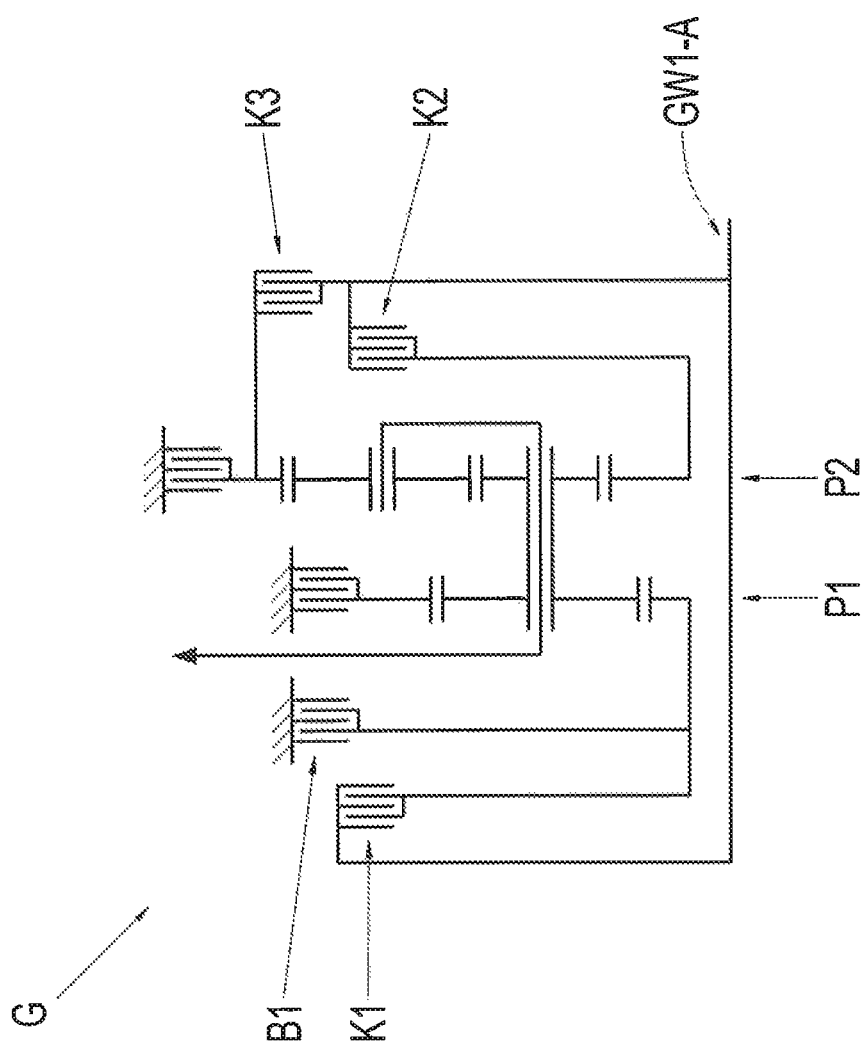
FIG. 3 a schematic representation of a transmission according to a second example configuration of the invention.

FIG. 3 shows a schematic representation of the transmission G according to a second example configuration of the invention. This example configuration most closely corresponds to the previous variant according to FIG. 2, with the difference that, in this case, a transmission input GW1-A is provided axially on a side of the second planetary gear set P2 facing away from the first planetary gear set P1. For this purpose, the drive shaft GW1 is guided axially into said region, starting from a side of the first planetary gear set P1 facing away from the second planetary gear set P2. This also has the result that the third shift element K2 and the fourth shift element K3 are now located on the input side, while the first shift element B1 and the second shift element K1 are disposed on a hereto opposite end of the transmission G. In all other respects, the example configuration according to FIG. 3 corresponds to the variant according to FIG. 2, so that reference is made to the description thereof.

Figure 4:
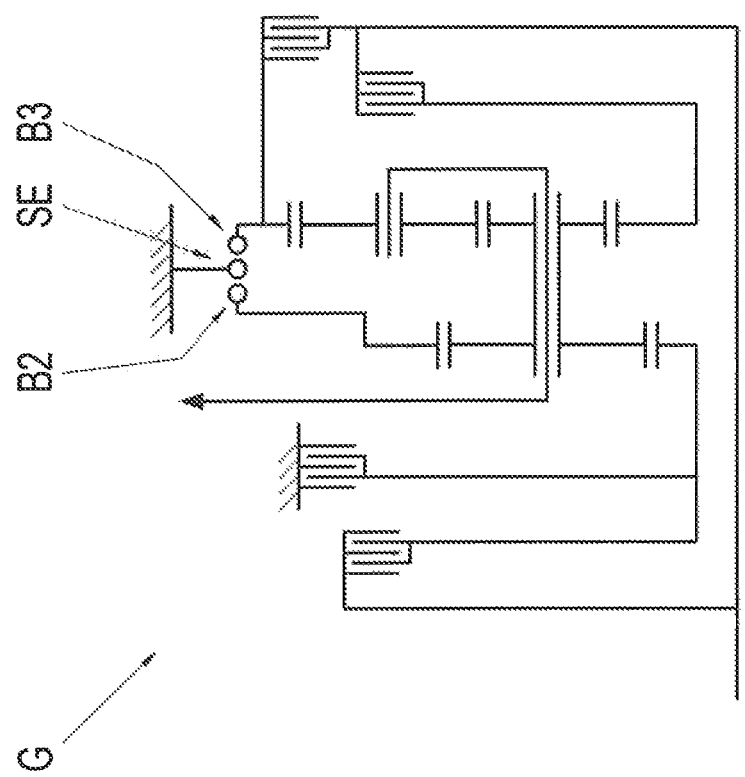
FIG. 4 a schematic view of a transmission according to a third example embodiment of the invention.

FIG. 4 further shows a schematic view of a transmission G according to a third example embodiment of the invention, which likewise substantially corresponds to the example configuration according to FIG. 2. The difference is that the fifth shift element B2 and the sixth shift element B3 are respectively designed as positive-locking shift elements in the form of dog clutches. The fifth shift element B2 and the sixth shift element B3 are furthermore combined to form a dual shift element SE; i.e. the two shift elements B2 and B3 have a common coupling element in the form of a common shifting dog, via which, in addition to a neutral position, either an engaged state of the fifth shift element B2 or an engaged state of the sixth shift element B3 can be represented. In all other respects, the variant according to FIG. 4 corresponds to the embodiment according to FIG. 2, so that reference is made to the description of FIG. 2.

Figure 5:
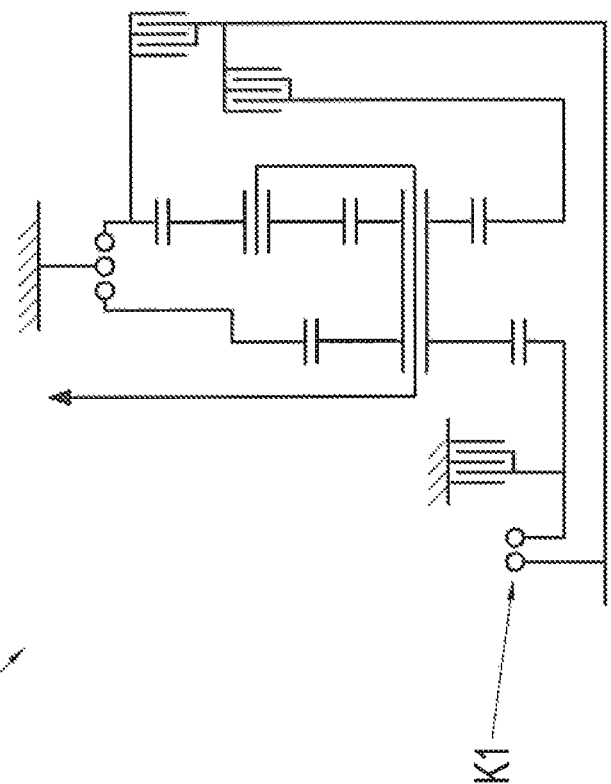
FIG. 5 a schematic representation of a transmission according to a fourth example configuration of the invention.

FIG. 5 further shows a schematic representation of a transmission G according to a fourth example embodiment of the invention, which most closely corresponds to the preceding example variant according to FIG. 4. The only difference is that the second shift element K1 is now designed as a positive-locking shift element as well, and is preferably present in the form of a dog clutch. In all other respects, the embodiment according to FIG. 5 corresponds to the preceding variant, so that, regarding the further configuration, reference is made to FIG. 4.

Figure 6:
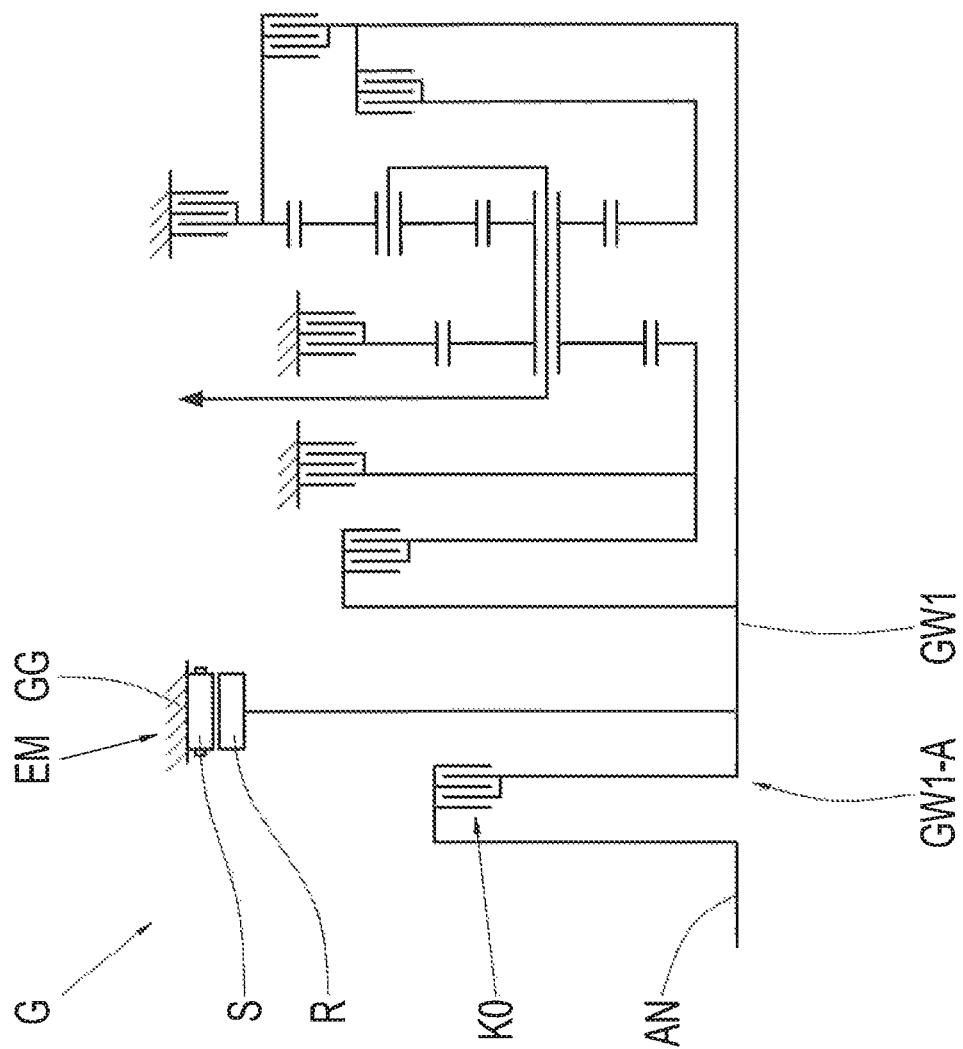
FIG. 6 a schematic view of a transmission according to a fifth example embodiment of the invention.

FIG. 6 shows a schematic representation of a transmission G according to a fifth example embodiment of the invention. This embodiment also corresponds substantially to the example variant according to FIG. 2. The difference is the additional provision of an electric motor EM, the stator S of which is fixed to the torque-proof component GG, while a rotor R of the electric motor EM is connected in a rotationally fixed manner to the drive shaft GW1, and thus also to the transmission input GW1-A. The transmission input GW1-A can also be connected in a rotationally fixed manner via an intermediate disconnect clutch K0, which in the present case is designed as a multi-disc shift element, to a connecting shaft AN, which is in turn connected to a crankshaft of the internal combustion engine VKM from FIG. 1 by the intermediate torsional vibration damper TS.

A purely electric driving can be realized by the electric motor EM, whereby in this case the disconnect clutch K0 is disengaged to decouple the transmission input GW1-A from the connecting shaft AN and to not drag the internal combustion engine VKM. In all other respects, the embodiment according to FIG. 6 corresponds to the variant according to FIG. 2, so that reference is made to the description thereof.

Figure 7:
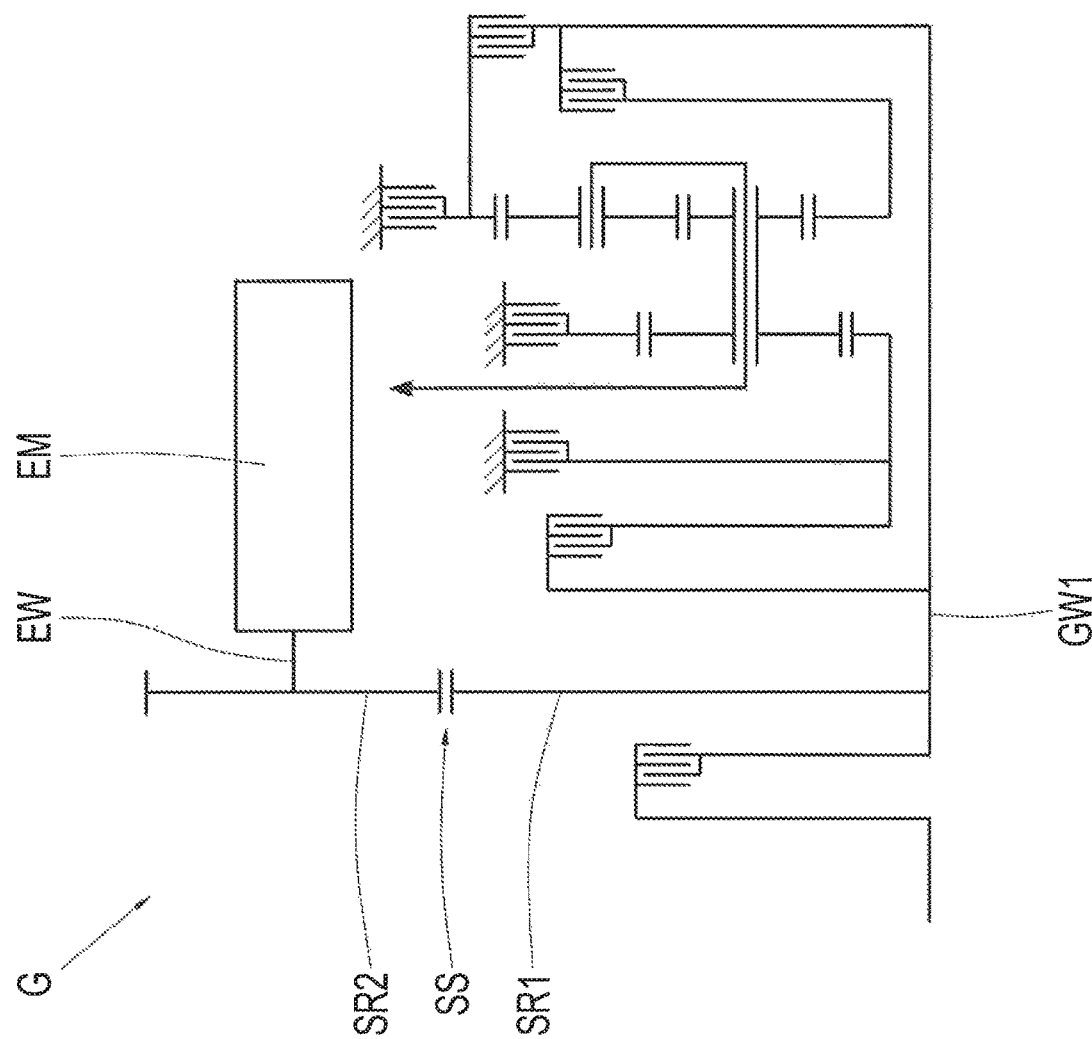
FIG. 7 a schematic representation of a transmission according to a sixth example configuration of the invention.

FIG. 7 shows a schematic view of a transmission G according to a sixth example configuration of the invention, which most closely corresponds to the immediately preceding example embodiment according to FIG. 6. The difference is that a rotor (not shown here in more detail) of an electric motor EM is not directly connected in a rotationally fixed manner to the drive shaft GW1, but is instead coupled to the drive shaft GW1 via an intermediate spur gear stage SS. In this case, a first spur gear SR1 of the spur gear stage SS is positioned on the drive shaft GW1 in a rotationally fixed manner and meshes with a second spur gear SR2 of the spur gear stage SS, which is arranged in a rotationally fixed manner on an input shaft EW of the electric motor EM. The rotor of the electric motor EM is then connected to the input shaft EW in a rotationally fixed manner. In all other respects, the variant according to FIG. 7 corresponds to the embodiment according to FIG. 6, so that reference is made to the description of FIG. 6.

Figure 8:
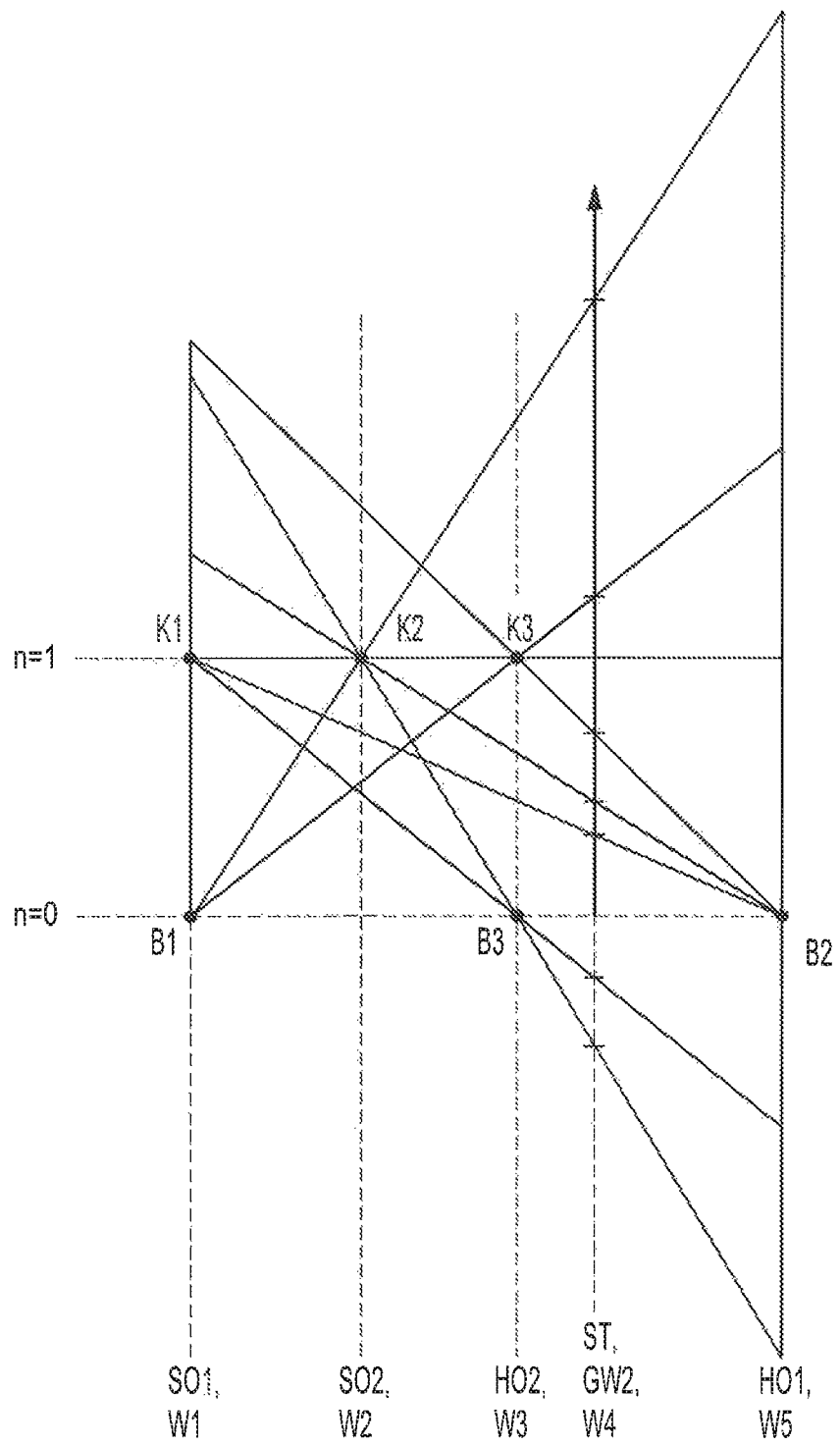
FIG. 8 a speed diagram.

FIG. 8 shows a speed diagram for the transmission G, which is applicable to all the previously discussed example embodiments. The speeds of the five shafts W1 to W5 of the transmission G are plotted in vertical direction in relation to the speed n of the drive shaft GW1. The maximum occurring speed n of the drive shaft GW1 is standardized to the value 1. The distances between the five shafts W1 to W5 are the result of the stationary carrier transmission ratios of the first and the second planetary gear set P1 and P2. Speed ratios belonging to a specific operating point can be connected by a straight line in the speed diagram. Therefore, if the speeds of two of the five shafts are known, the speed of the remaining three shafts can be read from the speed diagram as well. The purpose of this representation is merely illustrative; it is not to scale.

FIG. 9 shows an example of an engagement sequence diagram for the respective transmissions G from FIGS. 2 to 7 in the form of a table. As can be seen, in each case a total of six forward gears 1 to 6 and two reverse gears R1 and R2 can be realized, whereby each X in the columns of the shift pattern indicates which of the shift elements B1, K1, K2, K3, B2 and B3 are respectively engaged in which of the forward gears 1 to 6, and which of the reverse gears R1 and R2. In each of the forward gears 1 to 6 and the reverse gears R1 and R2, two of the shift elements B1, K1, K2, K3, B2 and B3 are engaged, whereby, with the exception of shifting into the second variant of the fourth forward gear 4.2, when successively shifting the forward gears 1 to 6, one respective involved shift element must be disengaged and one other shift element must subsequently be engaged.

As can be seen in FIG. 9, a first forward gear 1 is shifted by actuating the second shift element K1 and the fifth shift element B2. Based on this, a second forward gear 2 is formed by disengaging the second shift element K1 and subsequently engaging the third shift element K2. It is then further possible to shift into a third forward gear 3, by again disengaging the third shift element K2 and engaging the fourth shift element K3. Based on this, a fourth forward gear in a first variant 4.1 is then obtained by disengaging the fifth shift element B2 and engaging the second shift element K1. A fourth forward gear can alternatively also be shifted in a second variant 4.2 by engaging the second shift element K1 and the third shift element K2, and in a third variant 4.3 by actuating the third shift element K2 and the fourth shift element K3. For the embodiment of the transmission G from FIG. 5, the third variant 4.3 of the fourth forward gear has to be selected, because otherwise the second shift element K1, which is designed as a positive-locking shift element, would have to be engaged under load for variants 4.1 and 4.2.

A fifth forward gear 5 additionally results by actuating the first shift element B1 and the fourth shift element K3. Based on this, a sixth forward gear 6 can be shifted into by disengaging the fourth shift element K3 and engaging the third shift element K2.

The first reverse gear R1, in which reverse travel of the motor vehicle can also be realized when being driven by the internal combustion engine VKM, on the other hand, is shifted by engaging the second shift element K1 and the sixth shift element B3. In contrast, the second reverse gear R2, in which reverse travel can likewise be realized when being driven by the internal combustion engine VKM, can be produced by actuating the third shift element K2 and the sixth shift element B3.

Figure 10:
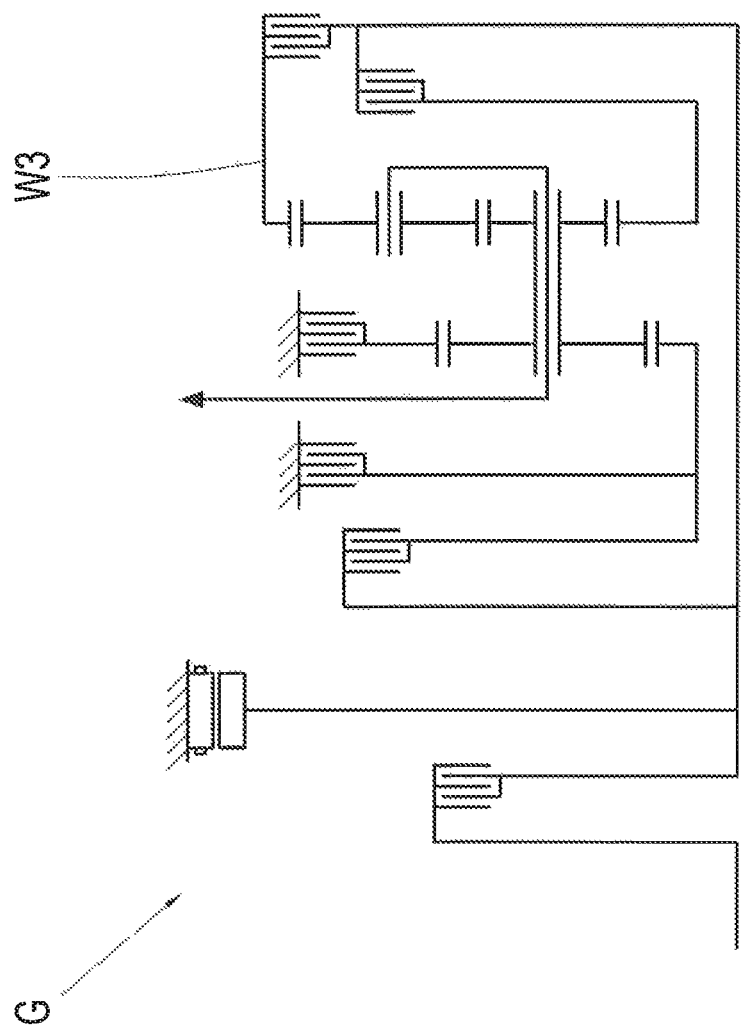
FIG. 10 a schematic view of a transmission according to a seventh example embodiment of the invention.

In addition to this, FIG. 10 shows a schematic representation of a transmission G according to a seventh example embodiment of the invention. This embodiment corresponds substantially to the example variant according to FIG. 6. The only difference is that, in this case, the in-order-of-rotation-speed third shaft W3 cannot be fixed. The consequence of this is that no mechanical reverse gears can be represented due to the omission of the sixth shift element. Instead, a reverse travel of the motor vehicle by the electric motor EM can be realized by using the forward gears of the transmission G and initiating an opposite direction of rotation via the electric motor EM. In all other respects, the variant according to FIG. 10 corresponds to the embodiment according to FIG. 6, so that reference is made to the description of FIG. 6.

Figure 11:
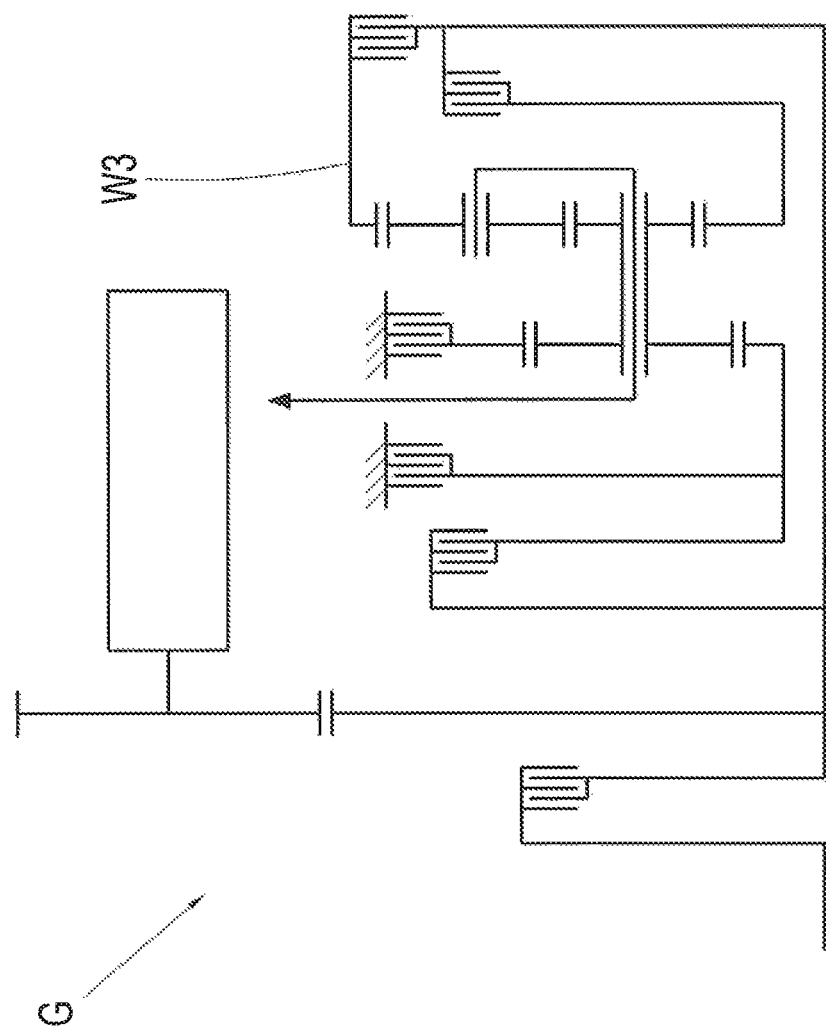
FIG. 11 a schematic representation of a transmission according to an eighth example configuration of the invention.

FIG. 11 further shows a schematic view of a transmission G according to an eighth example configuration of the invention, which corresponds most closely to the embodiment according to FIG. 7. As in the immediately preceding variant according to FIG. 10, the only difference is that the in-order-of-rotation-speed third shaft W3 cannot be fixed. In this respect, no mechanical reverse gears can be represented here either. Instead, a reverse travel of the motor vehicle by the electric motor EM can be realized by using the forward gears of the transmission G and initiating an opposite direction of rotation via the electric motor EM. In all other respects, the variant according to FIG. 11 corresponds to the example configuration according to FIG. 7, so that reference is made to the description thereof.

FIG. 12 now shows an example of an engagement sequence diagram for the transmissions G of FIGS. 10 and 11. With respect to the forward gears 1 to 6, this is identical to the engagement sequence diagram according to FIG. 9. The only difference is that the reverse gears have been omitted.

The speed diagram shown in FIG. 8 applies to the transmissions G from FIGS. 10 and 11 as well, with the only deviation being that the in-order-of-rotation-speed third shaft W3 just cannot be fixed, thereby eliminating the two mechanical reverse gears.

Figure 13:
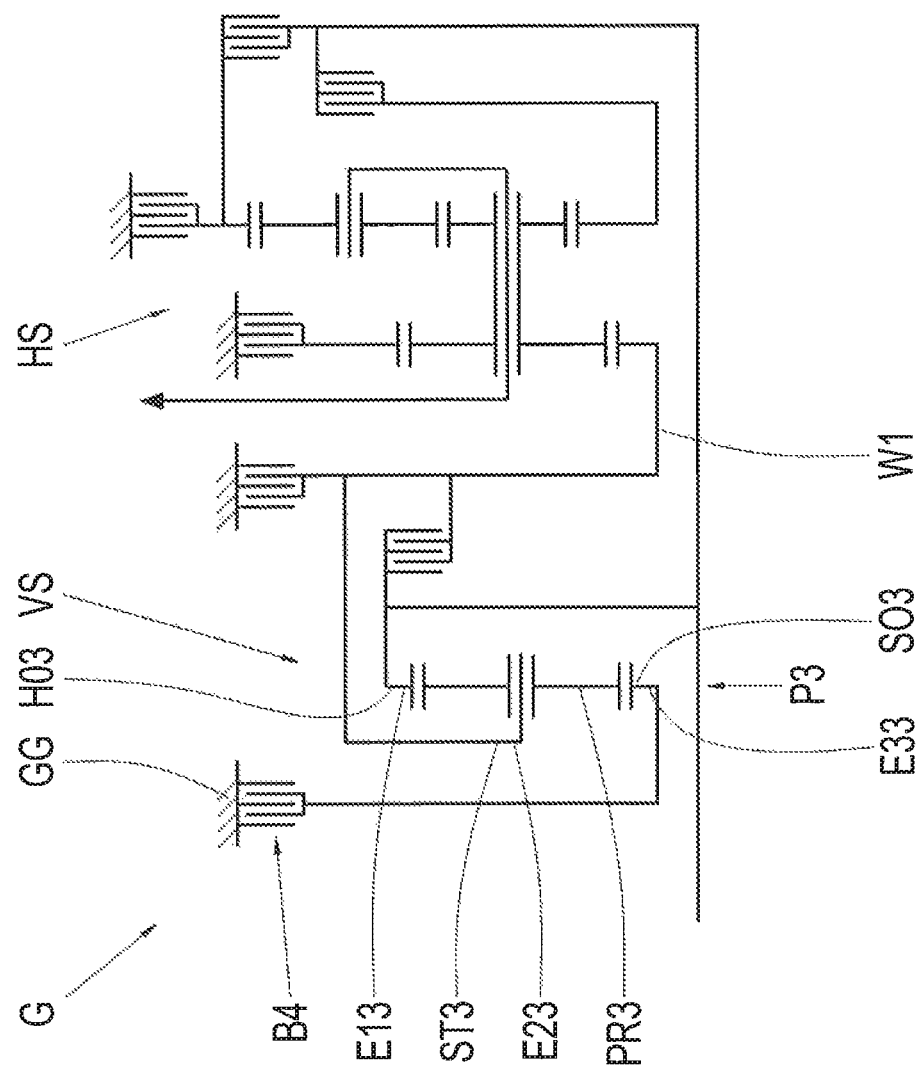
FIG. 13 a schematic view of a transmission according to a ninth example embodiment of the invention.

FIG. 13 shows a ninth example embodiment according to the invention of a transmission G, which substantially corresponds to the transmission G of FIG. 2. In addition to the main gear set HS, however, an upstream gear set VS that is formed by a planetary gear set P3 is now provided as well. This planetary gear set P3 is configured as a negative or minus planetary gear set with the elements E13, E23 and E33, whereby the first element E13 is designed as a ring gear HO3, the second element E23 as a planetary carrier ST3 and the third element E33 as a sun gear SO3. The planetary carrier ST3 carries at least one planetary gear PR3, which is in mesh with both the radially inner sun gear SO3 and the radially circumferential ring gear HO3.

In the present case, the first element E13 of the planetary gear set P3 is connected in a rotationally fixed manner to the drive shaft GW1, while the second element E23 of the planetary gear set P3 is connected in a rotationally fixed manner to the in-order-of-rotation-speed first shaft W1 of the main gear set HS. The third element E33 of the planetary gear set P3, on the other hand, can be fixed to the torque-proof component GG via an additional shift element B4. In all other respects, the embodiment according to FIG. 13 corresponds to the variant according to FIG. 2, so that reference is made to the description thereof.

Figure 14:
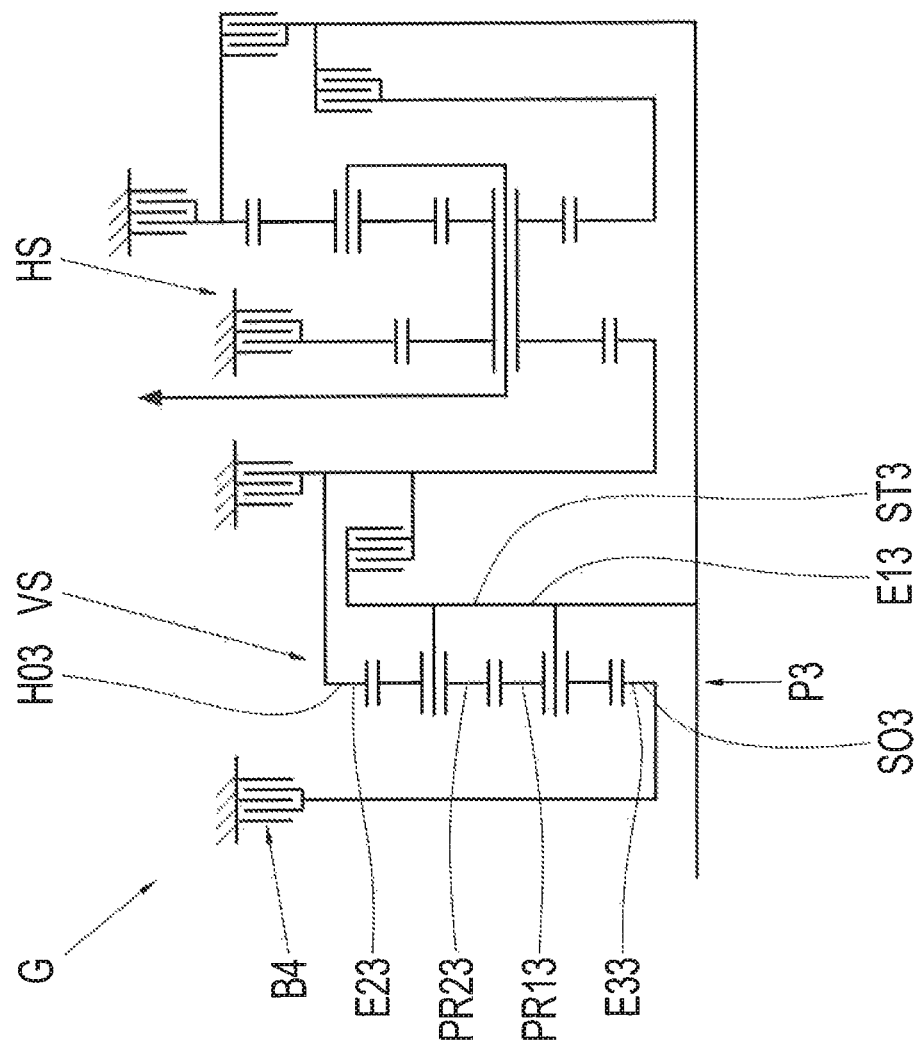
FIG. 14 a schematic representation of a transmission according to a tenth example configuration of the invention.

FIG. 14 shows a schematic representation of a transmission G according to a tenth example configuration of the invention. This example configuration most closely corresponds to the preceding variant according to FIG. 13, whereby the difference is that a first element E13 of the planetary gear set P3 is formed by a planetary carrier ST3, which carries at least one planetary gear pair with one respective radially inner planetary gear PR13 and one respective radially outer planetary gear PR23 mounted jointly in a rotatable manner. The one respective radially outer planetary gear PR23 is in mesh with a second element E23 of the third planetary gear set P3, which is in the form of the ring gear HO3, while the one respective radially inner planetary gear PR13 meshes with the third element E33 of the third planetary gear set P3, which is formed by the sun gear SO3. In addition, the planetary gears PR13 and PR23 of the at least one planetary gear pair are in mesh with one another. In this respect, the planetary gear set P3 of the upstream gear set VS here is designed as a positive or plus planetary gear set. Otherwise, the example configuration according to FIG. 14 corresponds to the preceding variant according to FIG. 13.

Figure 15:
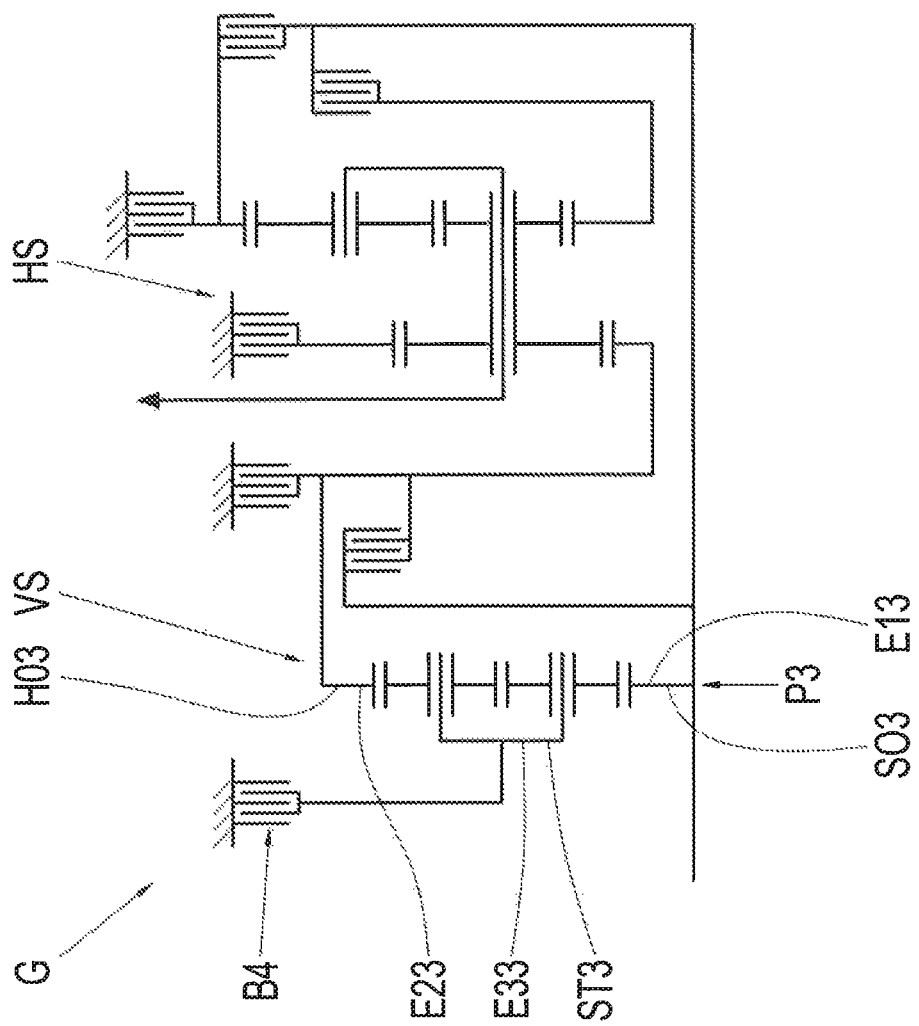
FIG. 15 a schematic view of a transmission according to an eleventh example embodiment of the invention.

In addition to this, FIG. 15 shows a schematic representation of a transmission G according to an eleventh example embodiment of the invention, which corresponds substantially to the variant of FIG. 14. The planetary gear set P3 of the upstream gear set VS is thus designed as a positive or plus planetary gear set in this case as well, whereby in this case, however, a first element E13 is formed by the sun gear SO3, a second element E23 by the ring gear HO3 and a third element E33 by the planetary carrier ST3. In all other respects, the embodiment according to FIG. 15 corresponds to the configuration according to FIG. 14, so that, regarding the further configuration, reference is made to the description of FIG. 14.

Figure 16:
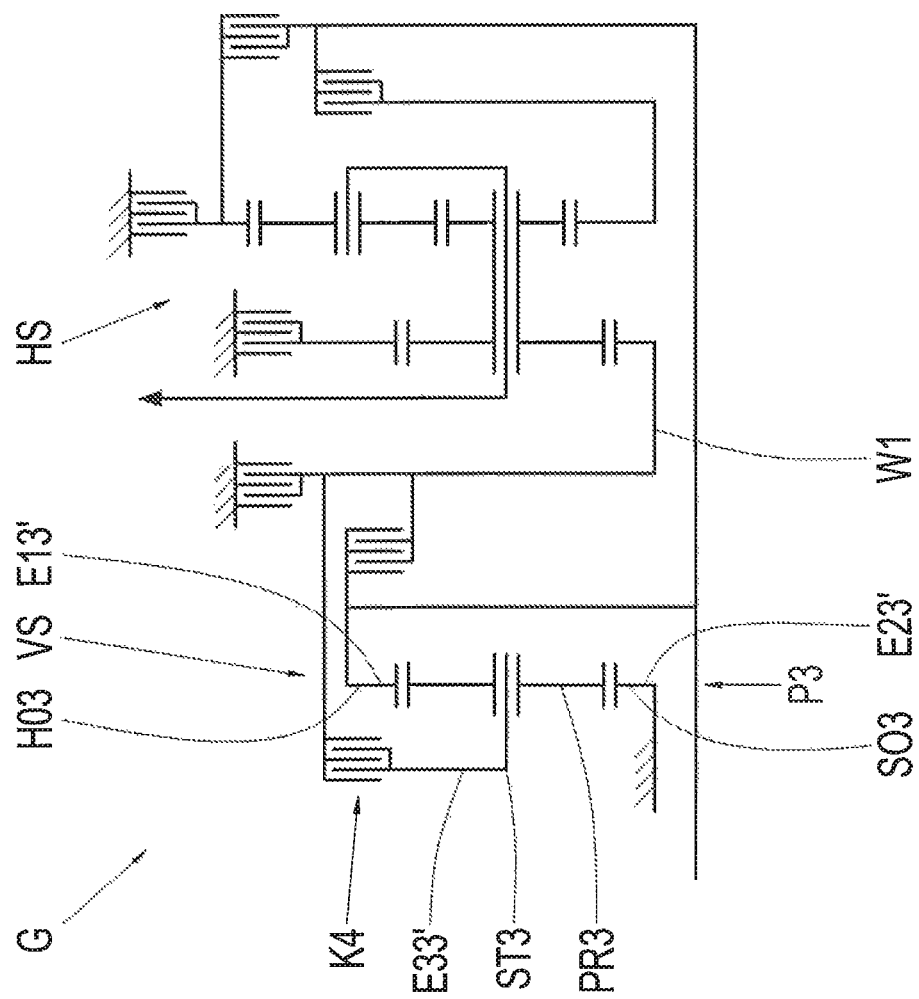
FIG. 16 a schematic representation of a transmission according to a twelfth example configuration of the invention.

FIG. 16 further shows a schematic view of a transmission G according to a twelfth example configuration of the invention, which most closely corresponds to the variant according to FIG. 13. Here too, an upstream gear set VS with a planetary gear set P3 is provided and a first element E13' of this planetary gear set P3 is connected in a rotationally fixed manner to the drive shaft GW1. The difference to the variant according to FIG. 13, however, is that a second element E23' is permanently fixed to the torque-proof component GG, while a third element E33' can be connected in a rotationally fixed manner to the in-order-of-rotation-speed first shaft W1 of the main gear set HS via an additional shift element K4. In doing so, the first element E13' is formed by the ring gear HO3 of the planetary gear set P3, the second element E23' by the sun gear SO3 of the planetary gear set P3 and the third element E33' by the planetary carrier ST3 of the planetary gear set P3. In conformity with the variant according to FIG. 13, the planetary gear set P3 is additionally designed as a negative or minus planetary gear set. In all other respects, the example configuration according to FIG. 16 corresponds to the variant according to FIG. 13.

Figure 17:
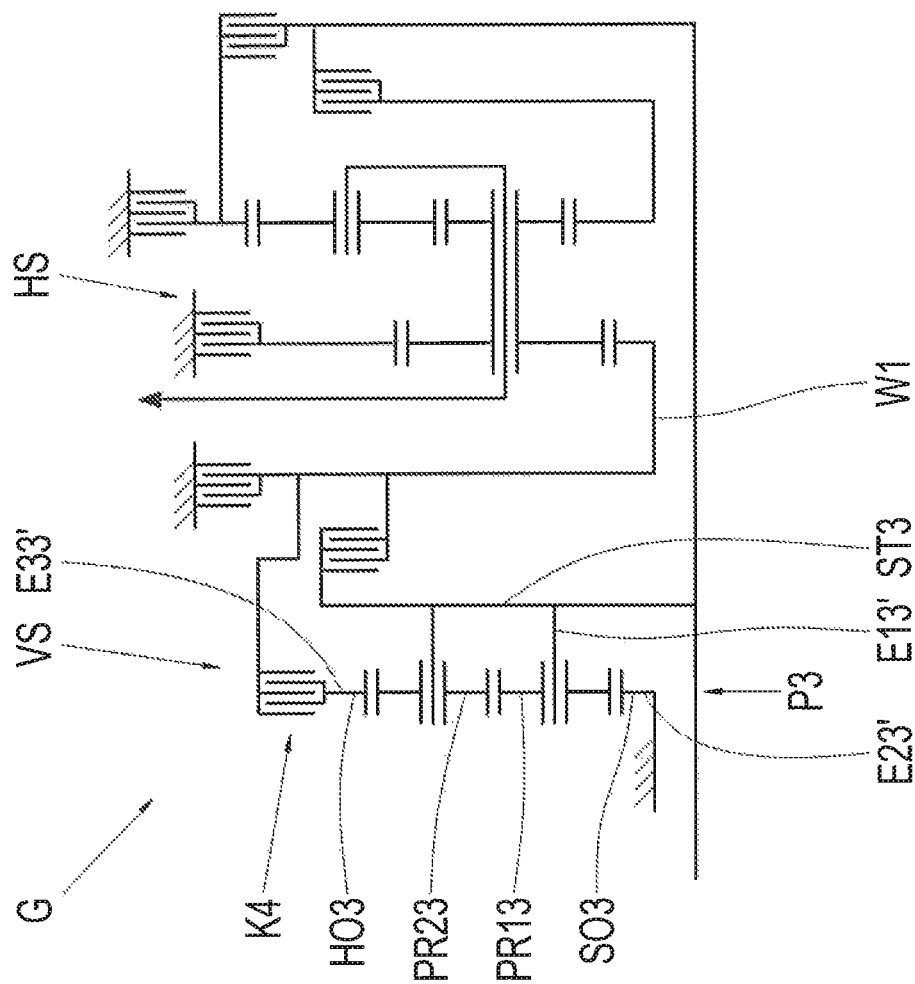
FIG. 17 a schematic view of a transmission according to a thirteenth example embodiment of the invention.

FIG. 17 shows a schematic representation of a transmission G according to a thirteenth example embodiment of the invention. This example configuration most closely corresponds to the preceding variant according to FIG. 16, whereby the difference is that a first element E13' of the planetary gear set P3 is formed by a planetary carrier ST3, which carries at least one planetary gear pair with one respective radially inner planetary gear PR13 and one respective radially outer planetary gear PR23 mounted jointly in a rotatable manner. The one respective radially inner planetary gear PR13 is in mesh with a second element E23' of the third planetary gear set P3, which, in accordance with the variant according to FIG. 16, is the sun gear SO3, while the one respective radially outer planetary gear PR23 meshes with the third element E33' of the third planetary gear set P3, which is in the form of the ring gear HO3. In addition, the planetary gears PR13 and PR23 of the at least one planetary gear pair are in mesh with one another. In this respect, the planetary gear set P3 of the upstream gear set VS here is designed as a positive or plus planetary gear set. Otherwise and in particular with respect to the connection of the elements E13' to E33', the example configuration according to FIG. 17 corresponds to the preceding variant according to FIG. 16.

Figure 18:
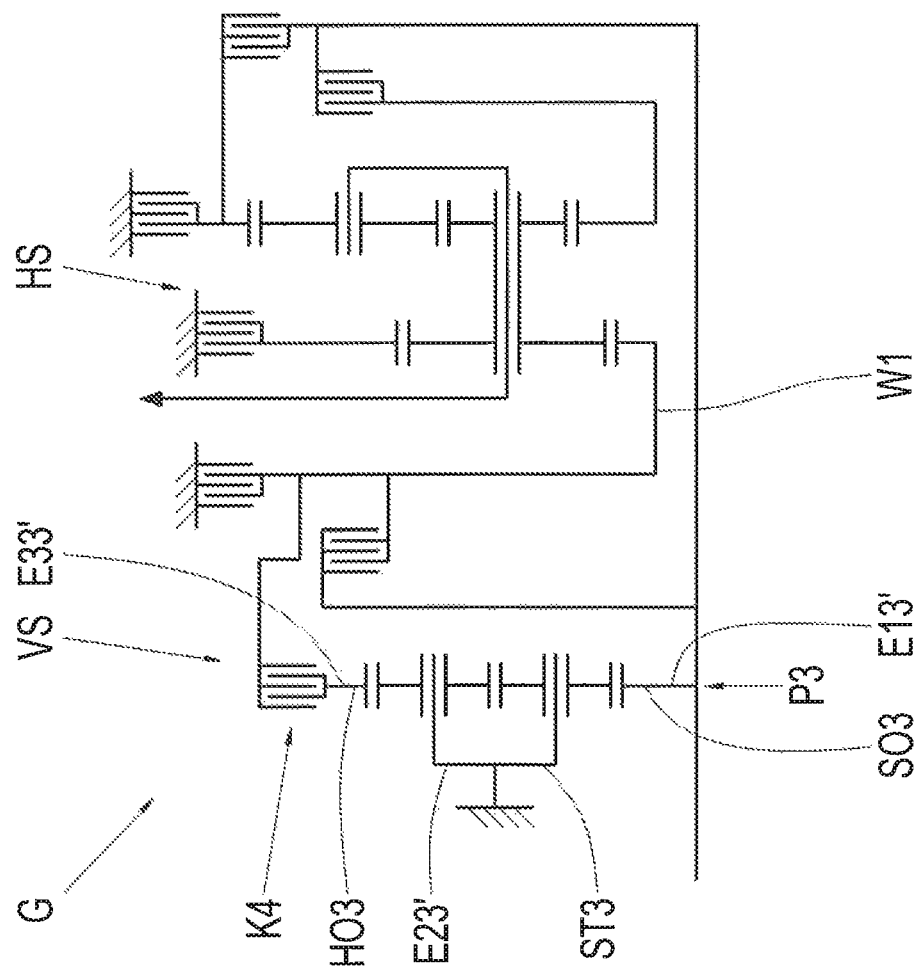
FIG. 18 a schematic representation of a transmission according to a fourteenth example configuration of the invention.

In addition to this, FIG. 18 shows a schematic representation of a transmission G according to a fourteenth example embodiment of the invention, which corresponds substantially to the variant of FIG. 17. The planetary gear set P3 of the upstream gear set VS is thus designed as a positive or plus planetary gear set in this case as well, and a third element E33' is formed by the ring gear HO3. In this case, however, the difference is that a first element E13' is designed as the sun gear SO3 and a second element E23' as the planetary carrier ST3. In all other respects, the embodiment according to FIG. 18 corresponds to the configuration according to FIG. 17, so that, regarding the further configuration, reference is made to the description of FIG. 17.

Figure 19:
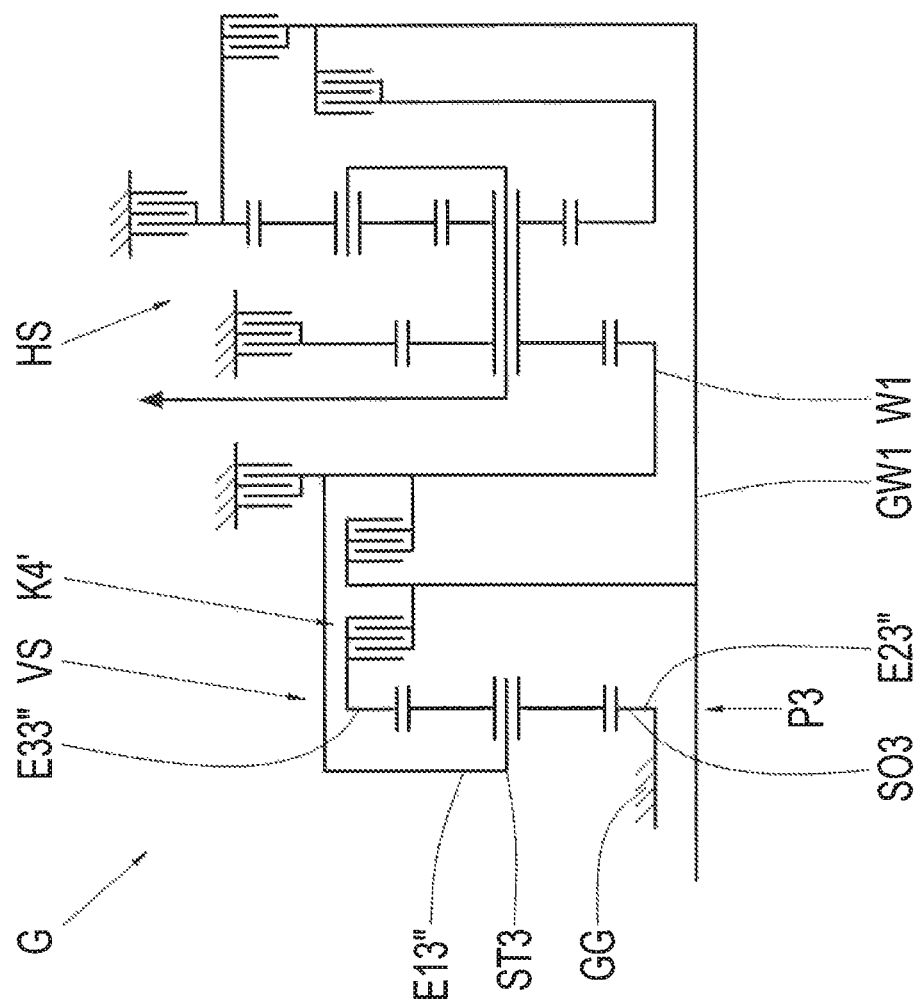
FIG. 19 a schematic view of a transmission according to a fifteenth example embodiment of the invention.

FIG. 19 further shows a schematic view of a transmission G according to a fifteenth example configuration of the invention, which in turn most closely corresponds to the variant according to FIG. 13. The transmission G of FIG. 19 also includes an upstream gear set VS with a planetary gear set P3. Here, however, a first element E13" is connected in a rotationally fixed manner to the in-order-of-rotation-speed first shaft W1 of the main gear set HS, while a second element E23" of the planetary gear set P3 is permanently fixed to the torque-proof component GG and a third element E33" can be connected in a rotationally fixed manner to the drive shaft GW1 via an additional shift element K4'. In doing so, the first element E13" is formed by the planetary carrier ST3 of the planetary gear set P3, the second element E23" by the sun gear SO3 of the planetary gear set P3 and the third element E33" by the ring gear HO3 of the planetary gear set P3. In accordance with the variant according to FIG. 13, the planetary gear set P3 is additionally designed as a negative or minus planetary gear set. Otherwise, the example configuration according to FIG. 19 corresponds to the variant according to FIG. 13.

Figure 20:
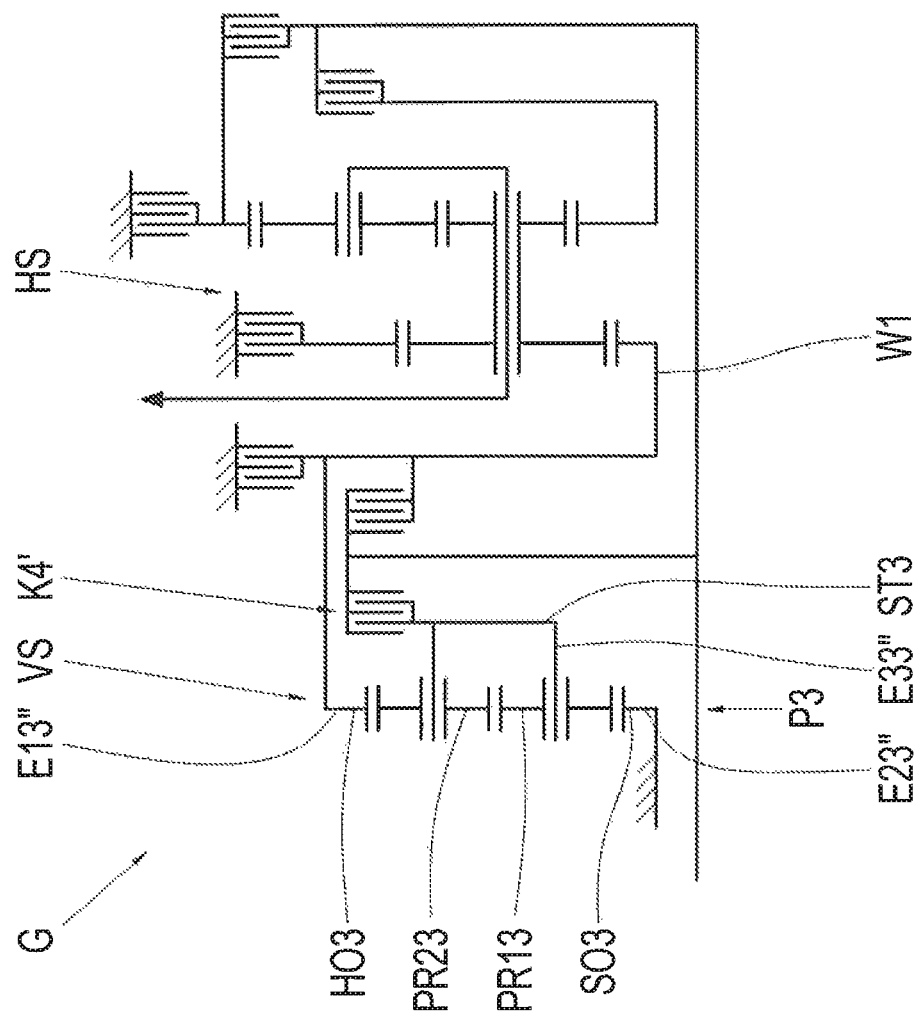
FIG. 20 a schematic representation of a transmission according to a sixteenth example configuration of the invention.

FIG. 20 further shows a schematic representation of a transmission G according to a sixteenth example embodiment of the invention. This example configuration substantially corresponds to the preceding variant according to FIG. 19, whereby the difference is that a first element E13" of the planetary gear set P3 is formed by the ring gear HO3 that is in mesh with one respective radially outer planetary gear PR23 of at least one planetary gear pair, which is carried on the planetary carrier ST3 in a rotatably mounted manner and additionally includes one respective radially inner planetary gear PR13. In doing so, the one respective radially inner planetary gear PR13 is in mesh with a second element E23" of the third planetary gear set P3, which, in accordance with the variant according to FIG. 19, is the sun gear SO3, while the remaining third element E33" in the variant according to FIG. 20 is formed by the planetary carrier ST3. The planetary gears PR13 and PR23 of the at least one planetary gear pair are also in mesh with one another, so that the planetary gear set P3 of the upstream gear set VS is designed as a positive or plus planetary gear set in the embodiment according to FIG. 20. Otherwise and in particular with respect to the connection of the elements E13" to E33", the example configuration according to FIG. 20 corresponds to the preceding variant according to FIG. 19.

Figure 21:
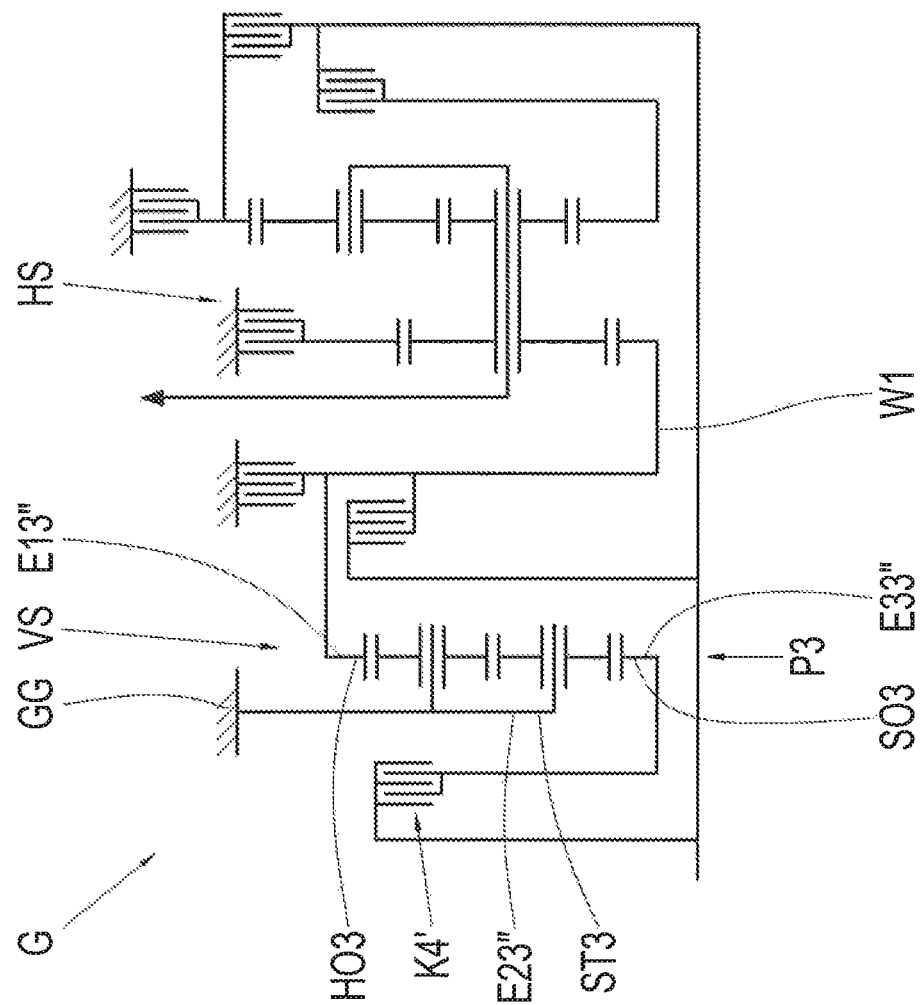
FIG. 21 a schematic view of a transmission according to a seventeenth example embodiment of the invention.

FIG. 21 shows a schematic representation of a transmission G according to a seventeenth example embodiment of the invention, which corresponds substantially to the immediately preceding variant of FIG. 20. The planetary gear set P3 of the upstream gear set VS is thus designed as a positive or plus planetary gear set in this case as well, and a first element E13" is formed by the ring gear HO3. In contrast to FIG. 20, however, a second element E23" is designed as the planetary carrier ST3 and a third element E33" as the sun gear SO3. In all other respects, the embodiment according to FIG. 21 corresponds to the configuration according to FIG. 20, so that, regarding the further configuration, reference is made to the description of FIG. 20.

Figure 22:
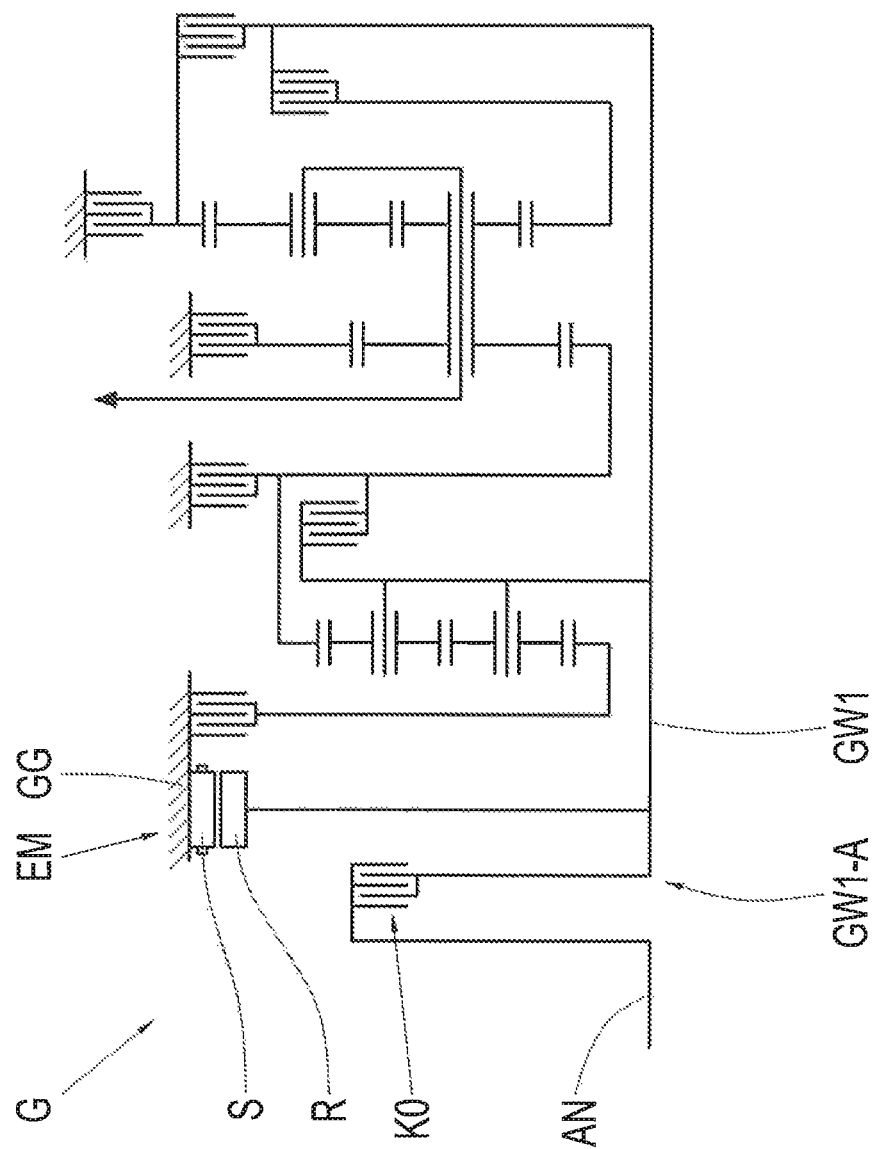
FIG. 22 a schematic representation of a transmission according to an eighteenth example configuration of the invention.

FIG. 22 further shows a schematic view of a transmission G according to an eighteenth example configuration of the invention. This corresponds most closely to the variant according to FIG. 14, whereby, as already in the embodiment according to FIG. 6, the difference is that an electric motor EM is additionally provided. A stator S of the electric motor EM is fixed on the torque-proof component GG, while a rotor R of the electric motor EM is connected in a rotationally fixed manner to the drive shaft GW1, and thus also to the transmission input GW1-A. The transmission input GW1-A can also be connected in a rotationally fixed manner via an intermediate disconnect clutch K0, which in the present case is designed as a multi-disc shift element, to a connecting shaft AN, which is in turn connected to a crankshaft of the internal combustion engine VKM from FIG. 1 by the intermediate torsional vibration damper TS.

A purely electric driving can be realized by the electric motor EM, whereby in this case the disconnect clutch K0 must be disengaged to decouple the transmission input GW1-A from the connecting shaft AN and to not drag the internal combustion engine VKM. In all other respects, the embodiment according to FIG. 22 corresponds to the variant according to FIG. 14, so that reference is made to the description of FIG. 14.

Figure 23:
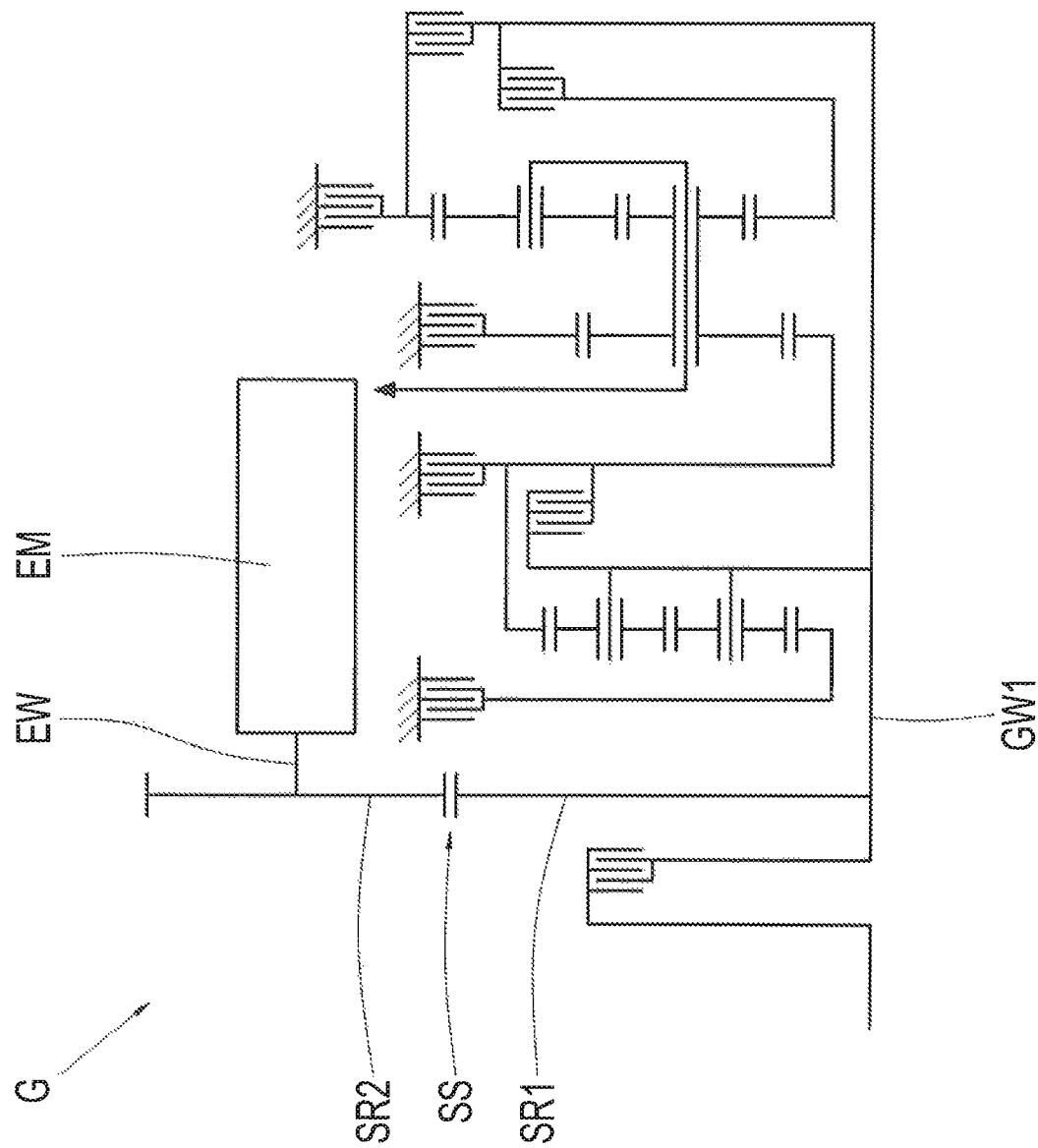
FIG. 23 a schematic view of a transmission according to a nineteenth example embodiment of the invention.

Finally, FIG. 23 shows a schematic view of a transmission G according to a nineteenth example configuration of the invention, which most closely corresponds to the immediately preceding embodiment according to FIG. 22 and is based on the variant according to FIG. 7. The difference is that a rotor (not shown here in more detail) of an electric motor EM is not directly connected to the drive shaft GW1 in a rotationally fixed manner. Instead, as previously in the variant according to FIG. 7, the rotor is coupled to the drive shaft GW1 via an intermediate spur gear stage SS. A first spur gear SR1 of the spur gear stage SS is positioned in a rotationally fixed manner on the drive shaft GW1 and meshes with a second spur gear SR2 of the spur gear stage SS, which is disposed in a rotationally fixed manner on an input shaft EW of the electric motor EM. The rotor of the electric motor EM is then connected in a rotationally fixed manner to the input shaft EW. In all other respects, the variant according to FIG. 23 corresponds to the embodiment according to FIG. 22, so that reference is made to the description of FIG. 22.

FIG. 24 shows an example of an engagement sequence diagram for the respective transmissions G from FIGS. 13 to 23 in the form of a table. It can be seen that, due to the additional arrangement of the upstream gear set VS, a total of nine forward gears 1' to 9', and three reverse gears R1' to R3' can be realized. In the columns of the engagement sequence diagram, X indicates which of the shift elements B1, K1, K2, K3, B2, B3 and B4 or K4 or K4' are respectively engaged in which of the forward gears 1' to 9', and which of the reverse gears R1' to R3'. In each of the forward gears 1' to 9' and the reverse gears R1' to R3', two of the shift elements B1, K1, K2, K3, B2, B3 and B4 or K4 or K4' are engaged, whereby, with the exception of shifting into the second variant of a fifth forward gear 5.2' and an eighth forward gear 8', when successively shifting the forward gears 1' to 9' one respective involved shift element must be disengaged and one other shift element must subsequently be engaged.

As can be seen in FIG. 24, a first forward gear 1' is shifted by actuating the fifth shift element B2 and the additional shift element B4 or K4 or K4'. Based on this, a second forward gear 2' is formed by disengaging the additional shift element B4 or K4 or K4' and subsequently engaging the second shift element K1. It is then further possible to shift into a third forward gear 3', by again disengaging the second shift element K1 and engaging the third shift element K2. A fourth forward gear 4' can then be formed, for which the third shift element K2 must be disengaged and the fourth shift element K3 must subsequently be closed. Based on this, a fifth forward gear in a first variant 5.1' is then obtained by disengaging the fifth shift element B2 and engaging the second shift element K1. A fifth forward gear can alternatively also be shifted in a second variant 5.2' by engaging the second shift element K1 and the third shift element K2, and in a third variant 5.3' by actuating the third shift element K2 and the fourth shift element K3.

A sixth forward gear 6' additionally results by actuating the fourth shift element K3 and the additional shift element B4 or K4 or K4'. Based on this, a seventh forward gear 7' is shifted by disengaging the additional shift element B4 or K4 or K4' and engaging the first shift element B1. An eighth forward gear 8' can then be formed, for which both the first shift element B1 and the fourth shift element K3 must be disengaged and the third shift element K2 and the additional shift element B4 or K4 or K4' must subsequently be engaged. A ninth forward gear 9' is lastly obtained on the basis of the eighth forward gear 8', by disengaging the additional shift element B4 or K4 or K4' and actuating the first shift element B1.

The first reverse gear R1', in which reverse travel of the motor vehicle can also be realized when being driven by the internal combustion engine VKM, on the other hand, is shifted by engaging the sixth shift element B3 and the additional shift element B4 or K4 or K4'. In contrast, the second reverse gear R2', in which reverse travel can likewise be realized when being driven by the internal combustion engine VKM, can be produced by actuating the second shift element K1 and the sixth shift element B3. Finally, the third reverse gear R3' can additionally be formed by engaging the third shift element K2 and the sixth shift element B3.

The variant shown in FIG. 4, according to which the shift elements B2 and B3 are designed as positive-locking shift elements, can be realized entirely or partially in the other embodiments as well, by configuring individual or both shift elements B2 and B3 as positive-locking shift elements. The example configuration shown in FIG. 5, on the other hand, can only be used in the variants according to FIGS. 6 and 7, and 10 and 11, because here the second shift element K1 is involved in the first forward gear 1.

The rotor embodiments according to the invention enable the realization of a transmission with a compact design and good efficiency.

Modifications and variations can be made to the embodiments illustrated or described herein without departing from the scope and spirit of the invention as set forth in the appended claims.

REFERENCE SIGNS

| | |
|---|---|
| G | transmission |
| GG | torque-proof component |
| HS | main gear set |
| VS | upstream gear set |
| P1 | first planetary gear set |
| SO1 | sun gear of the first planetary gear set |
| PR1 | planetary gear of the first planetary gear set |
| HO1 | ring gear of the first planetary gear set |
| P2 | second planetary gear set |
| SO2 | sun gear of the second planetary gear set |
| PR12 | radially inner planetary gear of the second planetary gear set |
| PR22 | radially outer planetary gear of the second planetary gear set |
| HO2 | ring gear of the second planetary gear set |
| ST | planetary carrier |
| P3 | planetary gear set |
| SO3 | sun gear of the planetary gear set |
| PR3 | planetary gear of the planetary gear set |
| PR13 | radially inner planetary gear of the planetary gear set |
| PR23 | radially outer planetary gear of the planetary gear set |
| ST3 | planetary carrier of the planetary gear set |
| HO3 | ring gear of the planetary gear set |
| E13 | first element |
| E23 | second element |
| E33 | third element |
| E13' | first element |
| E23' | second element |
| E33' | third element |
| E13" | first element |
| E23" | second element |
| E33" | third element |
| W1 | first shaft |
| W2 | second shaft |
| W3 | third shaft |
| W4 | fourth shaft |
| W5 | fifth shaft |
| B1 | first shift element |
| K1 | second shift element |
| K2 | third shift element |
| K3 | fourth shift element |
| B2 | fifth shift element |
| B3 | sixth shift element |
| B4 | additional shift element |
| K4 | additional shift element |
| K4' | additional shift element |
| SE | dual shift element |
| 1 | first forward gear |
| 2 | second forward gear |
| 3 | third forward gear |
| 4.1 | fourth forward gear |
| 4.2 | fourth forward gear |
| 4.3 | fourth forward gear |
| 5 | fifth forward gear |
| 6 | sixth forward gear |
| R1 | first reverse gear |
| R2 | second reverse gear |
| 1' | first forward gear |
| 2' | second forward gear |
| 3' | third forward gear |
| 4' | fourth forward gear |
| 5.1' | fifth forward gear |
| 5.2' | fifth forward gear |
| 5.3' | fifth forward gear |
| 6' | sixth forward gear |
| 7' | seventh forward gear |
| 8' | eighth forward gear |
| 9' | ninth forward gear |
| R1' | first reverse gear |
| R2' | second reverse gear |
| R3' | third reverse gear |
| GW1 | drive shaft |
| GW1-A | transmission input |

-continued

| | |
|---|---|
| GW2 | output shaft |
| GW2-A | transmission output |
| EM | electric motor |
| S | stator |
| R | rotor |
| AN | connecting shaft |
| K0 | disconnect clutch |
| VKM | internal combustion engine |
| TS | torsional vibration damper |
| AG | axle transmission |
| DW | drive wheels |
| SS | spur gear stage |
| SR1 | spur gear |
| SR2 | spur gear |
| EW | input shaft |

The invention claimed is:

1. A transmission (G) for a motor vehicle, comprising:
a transmission input (GW1-A);
a transmission output (GW2-A);
a main gear set (HS) having two planetary gear sets (P1, P2);
a plurality of shift elements with a first shift element (B1), a second shift element (K1), a third shift element (K2), a fourth shift element (K3) and a fifth shift element shift element (B2); and
an upstream gear set (VS) having a planetary gear set (P3) with a plurality of elements (E13, E23, E33; E13', E23', E33'; E13", E23", E33") including a ring gear (HO3), a planetary carrier (ST3) and a sun gear (SO3),
wherein the main gear set (HS) includes exactly five shafts, designated in order of rotation speed as the first shaft (W1), the second shaft (W2), the third shaft (W3), the fourth shaft (W4) and the fifth shaft (W5),
wherein the in-order-of-rotation-speed fourth shaft (W4) is permanently connected to the transmission output (GW2-A),
wherein the in-order-of-rotation-speed first shaft (W1) is either fixable by engaging the first shift element (B1) or connectable in a rotationally fixed manner with the transmission input (GW1-A) by actuating the second shift element (K1);
wherein the in-order-of-rotation-speed second shaft (W2) is connectable in a rotationally fixed manner with the transmission input (GW1-A) by actuating the third shift element (K2),
wherein the in-order-of-rotation-speed third shaft (W3) is connectable in a rotationally fixed manner with the transmission input (GW1-A) by actuating the fourth shift element (K3), and
wherein the in-order-of-rotation-speed fifth shaft (W5) is fixable by engaging the fifth shift element (B2).

2. The transmission (G) of claim 1, wherein:
six forward gears (1 to 6) are selectable between the transmission input (GW1-A) and the transmission output (GW2-A) by engagement of two of the five shift elements (B1, K1, K2, K3, B2);
a first forward gear (1) is shiftable by engaging the second shift element (K1) and the fifth shift element (B2);
a second forward gear (2) is shiftable by engaging the third shift element (K2) and the fifth shift element (B2);
a third forward gear (3) is shiftable by engaging the fourth shift element (K3) and the fifth shift element (B2);
a fourth forward gear (4.1, 4.2, 4.3) is shiftable by engaging the second shift element (K1) and the fourth shift element (K3), by engaging the second shift element (K1) and the third shift element (K2), or by engaging the third shift element (K2) and the fourth shift element (K3);
a fifth forward gear (5) is shiftable by engaging the first shift element (B1) and the fourth shift element (K3);
and a sixth forward gear (6) is shiftable by engaging the first shift element (B1) and the third shift element (K2).

3. The transmission (G) of claim 1, further comprising a sixth shift element (B3), wherein the in-order-of-rotation-speed third shaft (W3) is fixable by engaging the sixth shift element (B3).

4. The transmission (G) of claim 3, wherein at least one reverse gear (R1, R2) is selectable between the transmission input (GW1-A) and the transmission output (GW2-A) by engaging the sixth shift element (B3) and either the second shift element (K1) or the third shift element (K2).

5. The transmission (G) of claim 3, wherein the fifth shift element (B2) and the sixth shift element (B3) are combined to form a dual shift element (SE).

6. The transmission (G) of claim 1, wherein:
a first planetary gear set (P1) of the main gear set (HS) comprises at least one planetary gear (PR1), a sun gear (SO1) and a ring gear (HO1);
the at least one planetary gear (PR1) meshed with both the sun gear (SO1) and the ring gear (HO1) of the first planetary gear set (P1);
each of the at least one planetary gear (PRI) of the first planetary gear set (P1) coupled in a rotationally fixed manner to a respective radially inner planetary gear (PR12) of a second planetary gear set (P2) of the main gear set (HS);
the respective radially inner planetary gear (P12) meshed with a sun gear (SO2) of the second planetary gear set (P2) and a respective radially outer planetary gear (PR22) of the second planetary gear set (P2); and
the respective radially outer planetary gear (PR22) meshed with a ring gear (HO2) of the second planetary gear set (P2).

7. The transmission (G) of claim 6, wherein each of the at least one planetary gear (PR1) of the first planetary gear set (P1) and the respective radially inner planetary gear (PR12) of the second planetary gear set (P2) are combined to form one stepped planetary gear.

8. The transmission (G) of claim 6, wherein:
the in-order-of-rotation-speed first shaft (W1) is connected to the sun gear (SO1) of the first planetary gear set (P1) in a rotationally fixed manner;
the in-order-of-rotation-speed second shaft (W2) is connected in a rotationally fixed manner to the sun gear (SO2) of the second planetary gear set (P2);
the in-order-of-rotation-speed third shaft (W3) is connected in a rotationally fixed manner to the ring gear (HO2) of the second planetary gear set (P2);
the in-order-of-rotation-speed fourth shaft (W4) is connected in a rotationally fixed manner to a planetary carrier (ST), which rotationally supports both the at least one planetary gear (PR1) of the first planetary gear set (P1) and the planetary gears (PR12, PR22) of the second planetary gear set (P2); and
the in-order-of-rotation-speed fifth shaft (W5) is connected to the ring gear (HO1) of the first planetary gear set (P1) in a rotationally fixed manner.

9. The transmission (G) of claim 1, wherein one or more of the plurality of shift elements (B1, K1, K2, K3, B2, B3) is a force-locking shift element.

10. The transmission (G) of claim 1, wherein one or more of the second shift element (K1), the fifth shift element (B2) and the sixth shift element (B3) is a positive-locking shift element.

11. The transmission (G) of claim 1, further comprising an electric motor (EM) and a rotatable component, a rotor (R) of the electric motor (EM) coupled with the rotatable component.

12. The transmission (G) of claim 11, wherein the rotor (R) is coupled with the transmission input (GW1-A).

13. The transmission (G) of claim 1, further comprising a disconnect clutch (K0) and a connecting shaft (AN), the drive shaft (GW1-A) connectable in a rotationally fixed manner to the connecting shaft (AN) via the disconnect clutch (K0).

14. The transmission (G) of claim 1, wherein the first element (E13) of the planetary gear set (P3) is connected in a rotationally fixed manner to the transmission input (GW1-A), the second element (E23) of the planetary gear set (P3) is connected in a rotationally fixed manner to the in-order-of-rotation-speed first shaft (W1) of the main gear set (HS), and the third element (E33) of the planetary gear set (P3) is fixable by an additional shift element (B4).

15. The transmission (G) of claim 1, wherein the first element (E13') of the planetary gear set (P3) is connected in a rotationally fixed manner to the transmission input (GW1-A), the second element (E23) of the planetary gear set (P3) is fixed, and the third element (E33') of the planetary gear set (P3) is connectable to the in-order-of-rotation-speed first shaft (W1) of the main gear set (HS) by an additional shift element (K4).

16. The transmission (G) of claim 1, wherein the first element (E13") of the planetary gear set (P3) is connected in a rotationally fixed manner to the in-order-of-rotation-speed first shaft (W1) of the main gear set (HS), the second element (E23") of the planetary gear set (P3) is fixed, and the third element (E33") of the planetary gear set (P3) is connectable in a rotationally fixed manner to the transmission input (GW1-A) by an additional shift element (K4').

17. The transmission (G) of claim 1, wherein
nine forward gears (1' to 9') are selectable between the transmission input (GW1-A) and the transmission output (GW2-A) by engagement of two of the five shift elements (B1, K1, K2, K3, B2) and an additional shift element (B4, K4, K4');
a first forward gear (1') is shiftable by engaging the fifth shift element (B2) and the additional shift element (B4, K4, K4');
a second forward gear (2') is shiftable by engaging the second shift element (K1) and the fifth shift element (B2);
a third forward gear (3') is shiftable by engaging the third shift element (K2) and the fifth shift element (B2);
a fourth forward gear (4') is shiftable by engaging the fourth shift element (K3) and the fifth shift element (B2);
a fifth forward gear (5.1', 5.2', 5.3') is shiftable by engaging two of the second shift element (K1), the third shift element (K2) and the fifth shift element (K3);
a sixth forward gear (6') is shiftable by engaging the fourth shift element (K3) and the additional shift element (B4, K4, K4');
a seventh forward gear (7') is shiftable by engaging the first shift element (B1) and the fourth shift element (K3);
an eighth forward gear (8') is shiftable by engaging the third shift element (K2) and the additional shift element (B4, K4, K4'); and
a ninth forward gear (9') is shiftable by engaging the first shift element (B1) and the third shift element (K2).

18. A motor vehicle drive train, comprising the transmission (G) according claim 1.

* * * * *